United States Patent
Itani

(10) Patent No.: US 8,467,665 B2
(45) Date of Patent: *Jun. 18, 2013

(54) PLAYBACK DEVICE, COMPUTER PROGRAM, PLAYBACK METHOD

(75) Inventor: Tetsuya Itani, Ikoma (JP)

(73) Assignee: Panasonic Corporation, Osaka (JP)

( * ) Notice: Subject to any disclaimer, the term of this patent is extended or adjusted under 35 U.S.C. 154(b) by 456 days.

This patent is subject to a terminal disclaimer.

(21) Appl. No.: 12/891,591

(22) Filed: Sep. 27, 2010

(65) Prior Publication Data

US 2011/0013881 A1    Jan. 20, 2011

Related U.S. Application Data

(62) Division of application No. 11/329,241, filed on Jan. 10, 2006, now Pat. No. 7,826,710.

(30) Foreign Application Priority Data

Jan. 13, 2005    (JP) .................................. 2005-005921

(51) Int. Cl.
| | |
|---|---|
| *H04N 5/783* | (2006.01) |
| *H04N 5/93* | (2006.01) |
| *H04N 5/935* | (2006.01) |
| *H04N 5/932* | (2006.01) |
| *H04N 5/931* | (2006.01) |

(52) U.S. Cl.
USPC ........... 386/343; 386/205; 386/206; 386/344; 386/345; 386/346; 386/347; 386/348; 386/349; 386/350; 386/351; 386/352; 386/353

(58) Field of Classification Search
USPC .................. 386/205, 206, 343–353
See application file for complete search history.

(56) References Cited

U.S. PATENT DOCUMENTS

| 5,444,491 A | 8/1995 | Lim |
| 5,999,220 A | 12/1999 | Washino |
| 2002/0010712 A1 | 1/2002 | Kimura |
| 2002/0136293 A1 | 9/2002 | Washino |
| 2003/0184679 A1 | 10/2003 | Mechan |
| 2004/0046707 A1 | 3/2004 | Mori |
| 2004/0071211 A1 | 4/2004 | Washino |
| 2004/0085480 A1 | 5/2004 | Salzer et al. |
| 2005/0008304 A1 | 1/2005 | Lin |
| 2006/0146040 A1* | 7/2006 | Shen ............................ 345/204 |

FOREIGN PATENT DOCUMENTS

| EP | 0 639 923 | 2/1995 |
| JP | 10-224728 | 8/1998 |
| JP | 2001-223983 | 8/2001 |
| JP | 2001-519122 | 10/2001 |
| JP | 2004-102027 | 4/2004 |
| JP | 2004-221999 | 8/2004 |
| WO | 99/57897 | 11/1999 |

OTHER PUBLICATIONS

"New Product Preview for Readers 1999 Part 1", AV Review, No. 87, Ongen Publishing Co., Ltd., 1999, pp. 32-37, with Verified Partial English Translation (6 pages total).

* cited by examiner

*Primary Examiner* — Daquan Zhao

(57) ABSTRACT

A playback device judges whether a connected display device is equipped to display only interlaced video or both interlaced and progressive video. If equipped to display both interlaced and progressive video, a mode setting unit 15 sets an operation mode of the playback device to an image quality mode for interlaced signal output or a continuity mode for progressive signal output, according to a user selection received via a GUI. If continuity mode is set, the playback device decodes the video stream and performs progressive signal output.

7 Claims, 21 Drawing Sheets

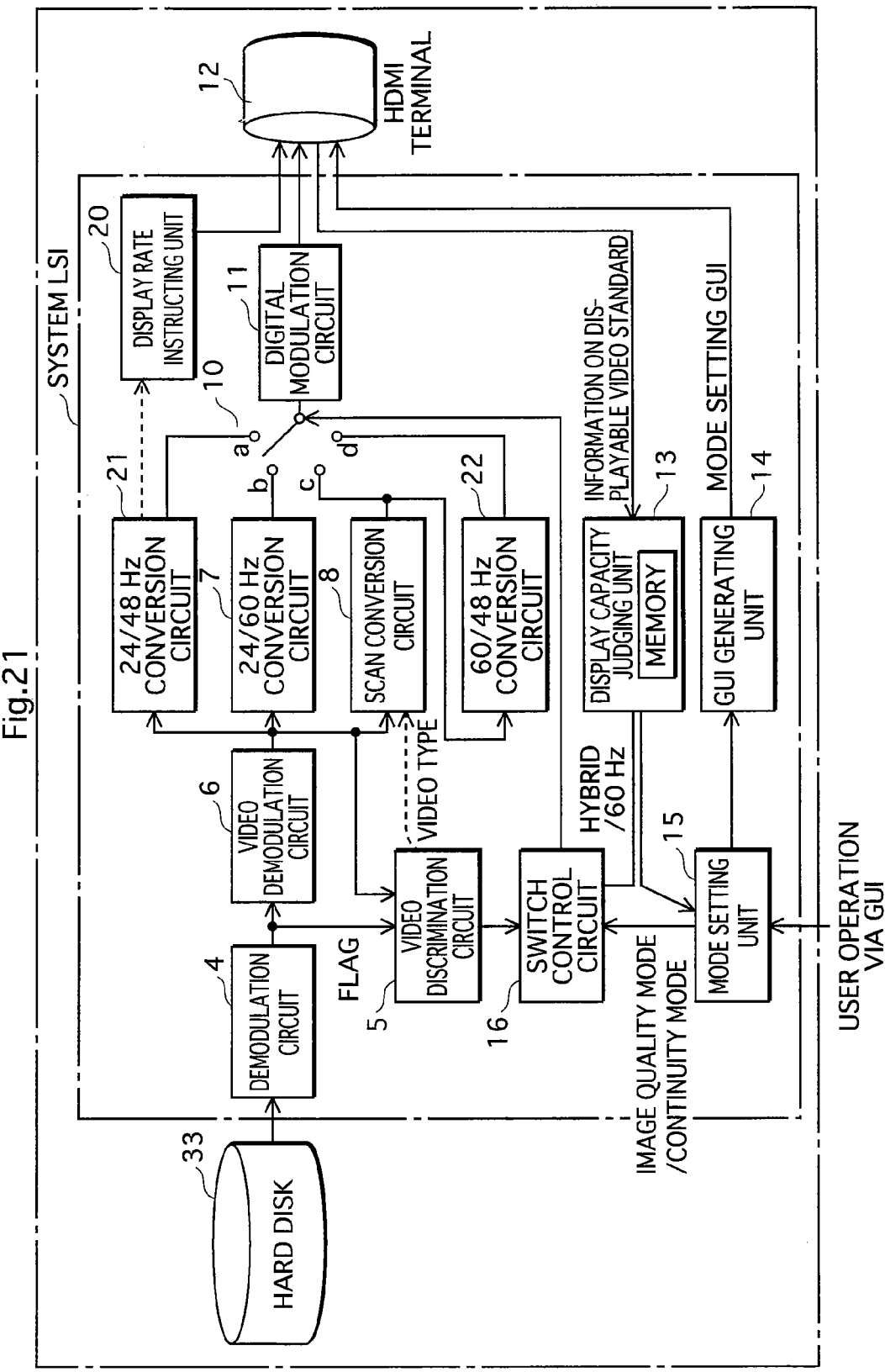

PLAYBACK DEVICE, COMPUTER PROGRAM, PLAYBACK METHOD

RELATED APPLICATIONS

This is a divisional application of U.S. Ser. No. 11/329,241, filed on Jan. 10, 2006, now U.S. Pat. No. 7,826,710 which claims priority from Japanese Application No. 2005-005921 filed Jan. 13, 2005.

BACKGROUND OF INVENTION

1. Field of the Invention

The present invention belongs to the technical field of video output technology.

2. Related Art

Video output technology concerns playing video information recorded on recording media or sent via a transmission line, and outputting video signals that conform to the scanning system designated by the mode set in the playback device.

Conventionally, these video signals are normally output via interlaced (odd/even field) scanning to enable playback on a television receiver. However, following the popularization of monitors and projectors compatible with progressive (sequential) scanning, as well as computer monitors and the like, the new trend in recent years has been to convert the frame rate of video signals for output.

Video output that takes these connections into account is also necessary, particularly given that multiscan monitors are capable of inputting progressive video signals at different frame rates.

The output rate of video signals depends on the status settings in the device. The status settings are set to default values when the device is shipped, with the user being able to freely change these settings via a graphic user interface (GUI) menu or the like.

SUMMARY OF INVENTION

While it is true that display devices compatible with progressive video signals are becoming widespread, there are also many playback devices capable of only receiving video signals at 60 fps (frames per second). If a playback device performs video output at 24 fps when connected to one of these monitors, the monitor may be unable to display the video output from the playback device.

Even with monitors capable of receiving both 24 fps and 60 fps video, sync will be off when switching between 24 fps and 60 fps video in the case of a mixed signal, possibly causing intermittent pictures.

When images are not displayed or display is disrupted, there is the risk of this developing into product complaints. To avoid this risk, most manufactures set the default settings to a display output of 60 fps when shipping playback devices, despite the devices having a 24 fps output capacity.

While product complaints do not arise in this case, 24 fps playback will not be performed unless the user intentionally sets the output capacity of the playback device to 24 fps. Thus, despite having the capacity to output at 24 fps, this capacity lies hidden within the playback device, without being utilized.

An object of the present invention is to provide a playback device that increases the opportunity for performing video output at 24 fps, while at the same time avoiding the risk of product complaints.

To achieve this object, a playback device pertaining to the present invention includes a judging unit operable to judge whether a display device connected to the playback device is equipped to display at only a first frame rate or at both the first frame rate and a second frame rate, a mode setting unit operable, if judged that the display device is equipped to display at both the first and second frame rates, to set an operation mode of the playback device, according to a user selection, to one of a continuous mode prohibiting frame rate switching during playback and a discontinuous mode permitting frame rate switching during playback, and a playback unit operable, if the playback device is set to the discontinuous mode, to perform signal output at one of the first frame rate and the second frame rate.

Since video output at a frame rate of 24 Hz is performed only after the user has intentionally set the operation mode of the playback device to the discontinuous mode, product complaints are unlikely even if display on the display device is interrupted or disrupted.

Furthermore, since the user is only permitted to select the discontinuous mode if the display device is equipped to display at both frame rates, any inconvenience that may arise from the user being permitted to select the discontinuous mode despite the display device only being able to display at the 60 Hz frame rate is also eliminated.

Being able to eliminate such inconvenience enables full advantage to be taken of signal output at the 24 Hz frame rate, and allows the user to experience the joys of high quality video.

When the input signal is a mixed signal, preferably the mode setting unit receives the user selection of one of the continuous mode and the discontinuous mode via a graphic user interface, and the graphic user interface warns the user of a possibility of display on the display device being disrupted if the mixed signal is output in the discontinuous mode.

Since the user is only permitted to select the discontinuous mode after being informed of the possibility of interrupted playback during output of a mixed signal, product complaints are unlikely even if disruptions occur during playback. Accordingly, the capacities of the playback device and the display device can be readily exhibited, in the case where the playback device is disposed in an environment that realizes 24 fps playback.

BRIEF DESCRIPTION OF DRAWINGS

These and other objects, advantages, and features of the invention will become apparent from the following description thereof taken in conjunction with the accompanying drawings, which illustrate specific embodiments of the present invention.

In the drawings:

FIG. 21 shows an internal structure of a playback device in the case where the video signal is input from a hard disk.

DETAILED DESCRIPTION OF PREFERRED EMBODIMENTS

Figure 1:
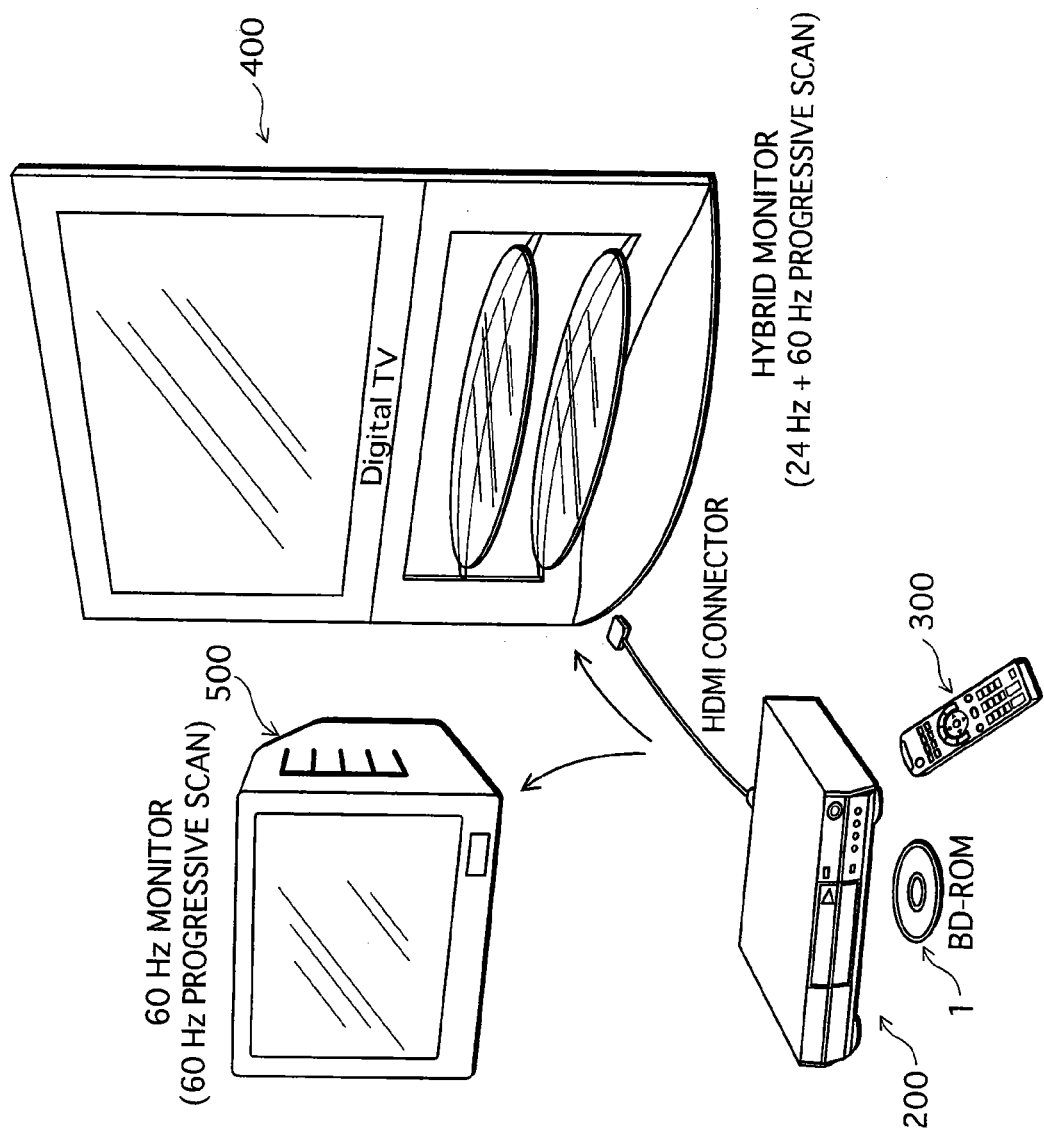
FIG. 1 shows a configuration relating to usage of a playback device pertaining to the present invention.

Embodiments of a playback device pertaining to the present invention are described below. To begin with, a configuration relating to usage of a playback device pertaining to the present invention in the implementation thereof is described firstly. FIG. 1 shows a configuration relating to usage of a playback device pertaining to the present invention. In FIG. 1, a playback device pertaining to the present invention is a playback device 200 used in a home theatre system composed of a remote controller 300, a hybrid monitor 400, and a 60 Hz monitor 500.

Playback device 200 plays video signals recorded on an optical disc 1. Playback device 200 outputs 60 fps progressive video signals (hereinafter, "60 Hz progressive signals") and 24 fps progressive video signals (hereinafter, "24 Hz progressive signals"). The playback device is a digital output terminal that sends these video signals to hybrid monitor 400 and 60 Hz monitor 500 via a high definition multimedia interface (HDMI) connector.

Hybrid monitor 400 is capable of displaying 60 Hz and 24 Hz progressive signals.

60 Hz monitor 500 is capable of displaying 60 Hz progressive signals.

This completes description of usage of a playback device pertaining to the present invention.

A configuration relating to production of a playback device pertaining to the present invention is described next. A playback device pertaining to the present invention can be industrially produced based on the internal structure diagram in FIG. 2.

Figure 2:
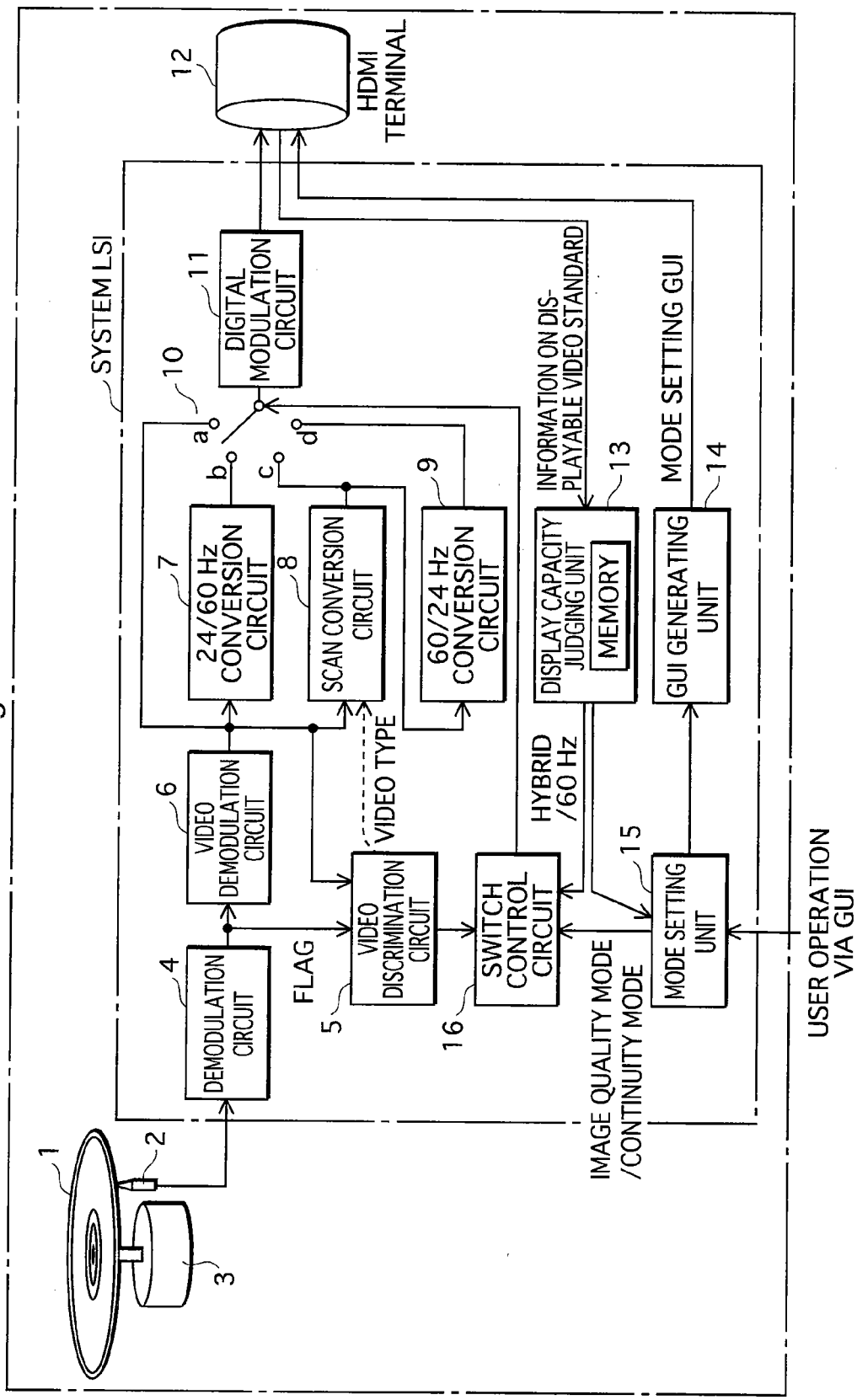
FIG. 2 is a block diagram of a playback device in an embodiment 1.

FIG. 2 is a block diagram of a playback device in an embodiment 1. In FIG. 2, the playback device is constituted from optical disc 1, an optical pickup 2, a motor 3, a demodulation circuit 4, a video discrimination circuit 5, a video demodulation circuit 6, 24/60 Hz conversion circuit 7, a scan conversion circuit 8, a 60/24 Hz conversion circuit 9, a switch 10, a digital modulation circuit 11, a terminal 12, a display capacity judging unit 13, a graphic user interface (GUI) generating unit 14, a mode setting unit 15, and a switch control circuit 16. The constituent elements from demodulation circuit 4 to switch control circuit 16, excluding terminal 12, are integrated as a single system LSI.

Optical Disc 1

Optical disc 1 (hereinafter, simply "disc 1") is a DVD-video, BD-ROM or similar optical disc having MPEG-2 (ITU-T Rec. H.262|ISO/IEC 13818-2) compressed video signals recorded thereon. Flags showing whether the compressed video signals are progressively scanned or interlaced scanned are also recorded on disc 1.

Figure 3:
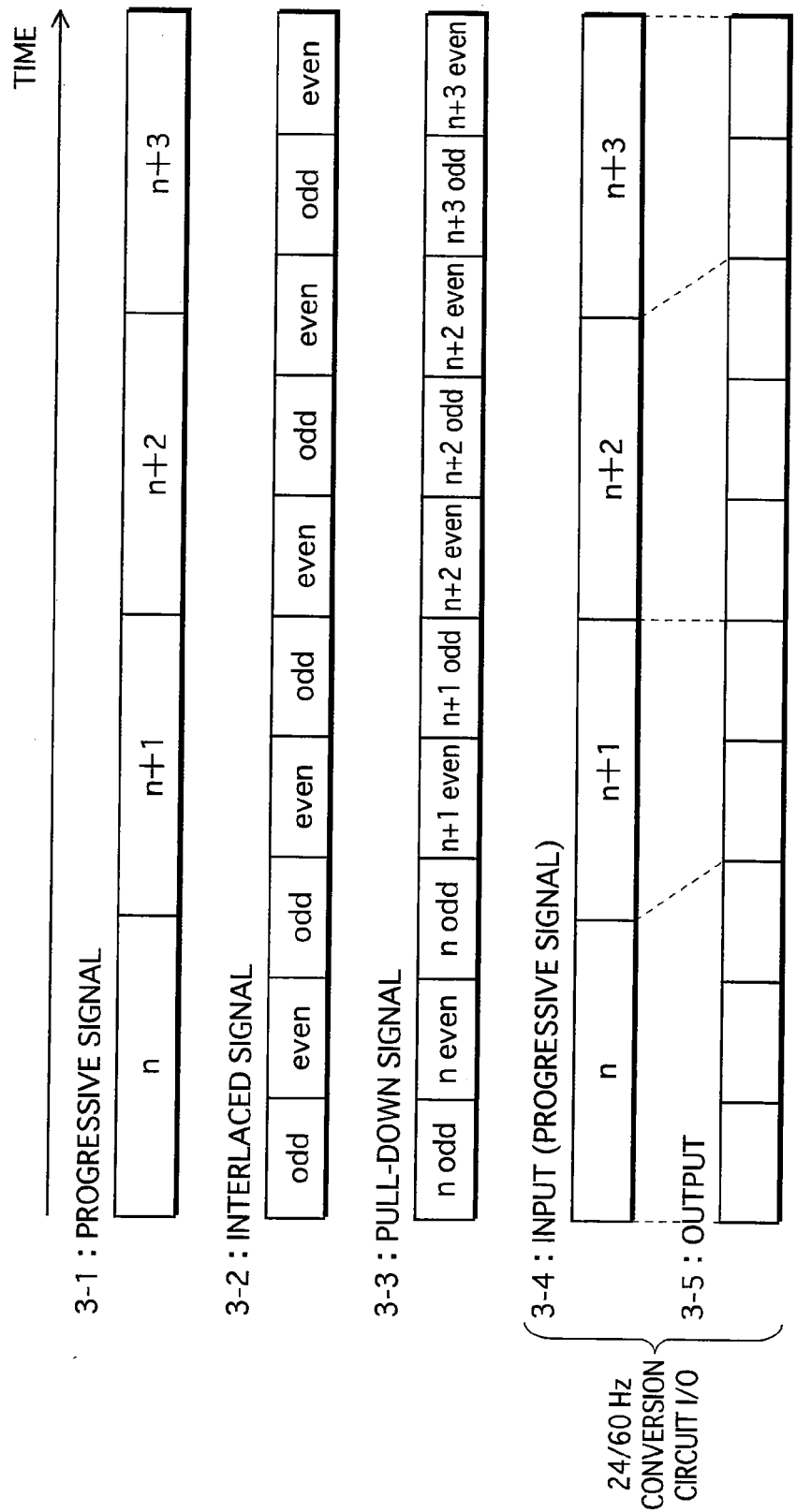
FIG. 3 shows three types of video signals recorded on an optical disk 1, and the I/O of a 24/60 Hz conversion circuit 7.

Three types of video signals are recorded on disc 1. FIG. 3 shows the three types of video signals recorded on disk 1.

Progressive signals have film-originated video signals as their signal source, and are composed of 24 fps frames n, n+1, n+2, n+3, as shown at level 3-1 in FIG. 3.

Interlaced signals have video signals generally captured by video camera as their signal source, and are composed of odd and even fields appearing at 30 fps (60 field/sec) intervals, as shown at level 3-2 in FIG. 3.

Pull-down signals are video signals obtained by performing 3:2 pull-down to convert each frame constituting 24 fps video alternately into two or three fields. As shown at level 3-3 in FIG. 3, a pull-down signal is composed of fields appearing every 30 fps (60 fields/sec) in the following manner: n odd, n even, n odd, n+1 even, n+1 odd, n+2 even, n+2 odd, n+2 even, n+3 odd, n+3 even. The flags are superimposed on the frames or fields constituting each video signal, and show the signal to be either progressively scanned or interlaced scanned. Thus by referring to the superimposed flags, the playback device is able to find out the signal type of a video signal, even if the signal has been changed during processing to a different type of signal.

With actual movies, other items are included besides the main feature, such as outtakes, interviews, and making of videos. These mostly consist of a scattering of progressive, interlaced and pull-down signals. Furthermore, for editing reasons, a single feature is often composed of a mixture of progressive, interlaced, and pull-down video. Thus, it is possible that a video signal read out when playing disc 1 may contain a mixture of progressive, interlaced, and pull-down signals. This completes description of disc 1.

Optical Pickup 2, Motor 3, Demodulation Circuit 4

Optical pickup 2 converts signals recorded on disc 1 to electrical signals.

Motor 3 rotates disc 1 at a suitable playback speed.

Demodulation circuit 4 demodulates an electrical signal resulting from the conversion by optical pickup 2 to obtain a bit string. Demodulation circuit 4 performs error correction and the like on the bit string, and outputs a compressed video signal and supplementary information necessary for playback.

Video Discrimination Circuit 5

Video discrimination circuit 5 determines from the output of demodulation circuit 4 and video demodulation circuit 6, whether a video signal played from disc 1 is a progressive signal, an interlaced signal, or a pull-down signal, with reference to the above flag values. Because flags showing whether the video signal is progressively scanned or interlaced scanned are superimposed in the output of demodulation circuit 4, video discrimination circuit 5 reads this flag information, and determines that the video signal is a progressive signal if the flags show the signal to be progressively scanned, and an interlaced signal or a pull-down signal if the flags show the signal to be interlaced scanned. Video discrimination circuit 5 is described in detail below.

Distinguishing Pull-down Signals from Interlaced Signals

Video discrimination circuit 5 determines whether an interlaced signal is a pull-down signal by the periodicity of a digital signal generated by video demodulation circuit 6. The judgment by video discrimination circuit 5 based on the periodicity of this signal is described in detail below.

Figure 4:
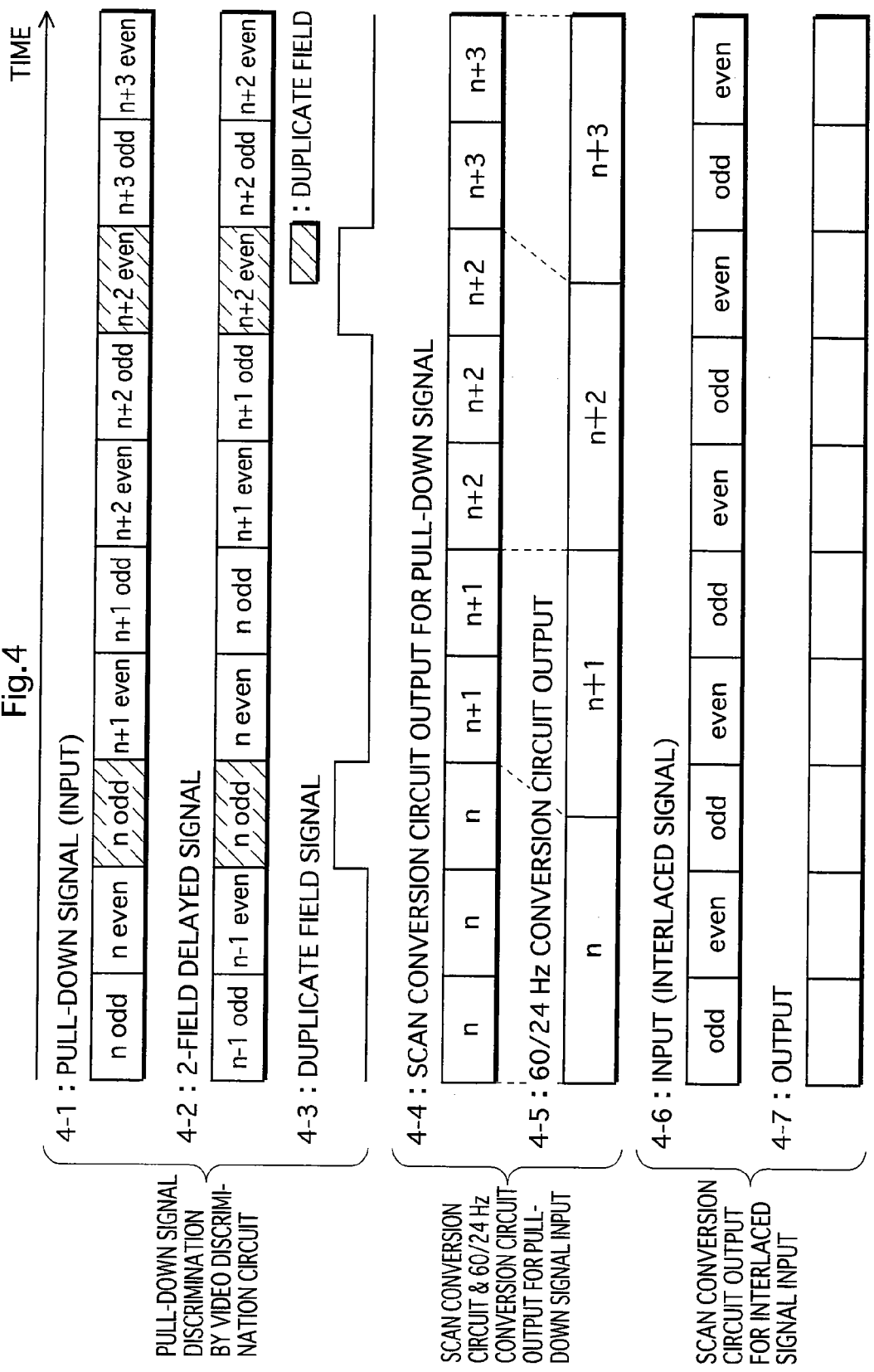
FIG. 4 shows video discrimination by a video discrimination circuit 5, and the I/O of a scan conversion circuit 8 and a 60/24 Hz conversion circuit 9.

Level 4-1 in FIG. 4 shows a pull-down signal. A feature of the 3:2 pull-down system is that duplicate fields are positioned once every five fields. A duplicate field is a field having the same content as a field positioned two fields previous. Video discrimination circuit 5 generates a delayed signal by delaying the pull-down signal by two fields. Level 4-2 shows the 2-field delayed signal. Video discrimination circuit 5 then compares the delayed signal with the pull-down signal. Matching fields that exist once every five fields (i.e. duplicate fields) are located in this way. If duplicate fields are located, video discrimination circuit 5 generates a signal indicating the matching fields, as shown at level 4-3. By detecting the occurrence of matching fields once every five fields, video discrimination circuit 5 distinguishes pull-down signals from interlaced signals. Video discrimination circuit 5 then instructs scan conversion circuit 8 as to whether or not the interlaced signal is a pull-down signal.

Video Demodulation Circuit 6

Video demodulation circuit 6 demodulates the compressed video signal input from demodulation circuit 4 to obtain a digital signal. The digital signal generated by video demodulation circuit 6 is input to a contact point a of switch 10, as well as to 24/60 Hz conversion circuit 7 and scan conversion circuit 8.

24/60 Hz Conversion Circuit 7

24/60 Hz conversion circuit 7 converts progressive signals recorded at 24 fps to 60 Hz progressive signals, and outputs the converted signals to a contact point b of switch 10. Levels 3-4 and 3-5 in FIG. 3 show the processing by 24/60 Hz conversion circuit 7. 24/60 Hz conversion circuit 7 converts frames n and n+2 out of the frames in the 24 Hz progressive signal shown at level 3-4 into three fields. Frames n+1 and n+3 are each converted into two fields. A 60 Hz progressive signal as shown at level 3-5 is obtained as a result.

Scan Conversion Circuit 8

If the interlaced signal output from video demodulation circuit 6 is a pull-down signal, scan conversion circuit 8 scan converts the signal using a first algorithm, and outputs a 60 Hz progressive signal. If the interlaced signal is not a pull-down signal, scan conversion circuit 8 scan converts the signal using a second algorithm, and outputs a 60 Hz progressive signal. The conversion results are output to contact point c of switch 10 and 60/24 Hz conversion circuit 9. Note that a detailed description of the first and second algorithms is omitted here since these algorithms are not the gist of the invention.

The conversion using the first algorithm is described with reference to FIG. 4. Level 4-4 in FIG. 4 shows output when the input signal is a pull-down signal. Scan conversion circuit 8 locates breaks between the frames constituting the original 24 fps video based on the position of the duplicate fields, and combines the fields within the original frames. In the case where a duplicate field signal is output, as shown at level 4-3, scan conversion circuit 8 classifies the fields constituting the pull-down signal, using the output timing of the duplicate field signal as indicating the breaks of frames n and n+2. This conversion results in the frames n, n, n, n+1, n+1, n+2, n+2, n+2, n+3, n+3 being obtained, as shown at level 4-4.

The input to scan conversion circuit 8 when the input signal is an interlaced signal is shown at levels 4-6 and 4-7. If the input signal is an interlaced signal as shown at level 4-6, a 60 Hz progressive signal as shown at level 4-7 is obtained.

There exist two types of interlaced signals: those obtained by performing 3:2 pull-down on film martial, and those obtained from video camera material. Since scan conversion circuit 8 must wait for video discrimination circuit 5 to determine which of these two types an interlaced signal belongs to, the interlaced signal is initially input to scan conversion circuit 8, and the decision of whether to perform the first or second algorithm on the interlaced signal is made once video discrimination circuit 5 has determined the signal type.

60/24 Hz Conversion Circuit 9

60/24 Hz conversion circuit 9 converts 60 fps video to 24 fps video, and outputs the converted signals to contact point d of switch 10. Specifically, 60/24 Hz conversion circuit 9 converts the output of scan conversion circuit 8, as shown at level 4-4 in FIG. 4, to the 24 fps video, as shown at level 4-5.

With 3:2 pull-down, two slow outputs are performed for every three fast outputs. Movement becomes choppy due to repeated performance of the three fast and two slow outputs. The conversion by scan conversion circuit 8 and 60/24 Hz conversion circuit 9 is necessary in order to eliminate this awkward movement.

Switch 10

Switch 10 selectively outputs the output of video demodulation circuit 6, 24/60 Hz conversion circuit 7, scan conversion circuit 8, and 60/24 Hz conversion circuit 9 to digital modulation circuit 11, by connecting to contact points a, b, c and d, respectively.

Digital Modulation Circuit 11

Digital modulation circuit 11 performs HDMI digital signal modulation on 24 Hz and 60 Hz progressive signals input from switch 10, and outputs the result to monitor 400 or monitor 500. Video signals are displayed as a result.

Terminal 12

Terminal 12 is compliant with high definition multimedia interface (HDMI) standards, and includes both a transmission line for digitally modulated video signals and a serial transmission line for intercommunication as defined in the VESA/E-DDC and EIA/CEA 861B standards. Monitors 400 and 500 are connected to terminal 12. Since each monitor has a ROM storing information on video standards displayable by the respective monitor, this information can be read via the serial transmission line.

Display Capacity Judging Unit 13

Display capacity judging unit 13 reads the information on displayable video standards from the ROM in a connected monitor via the serial transmission line, and judges whether the connected monitor is hybrid monitor 400 or 60 Hz monitor 500 based on the read information. The judgment result is notified to switch control circuit 16.

GUI Generating Unit 14

GUI generating unit 14 generates GUIs scripted using onscreen display (OSD) graphics and broadcast markup language (BML), and outputs the GUIs to hybrid monitor 400 for display.

Mode Setting Unit 15

Figure 5:
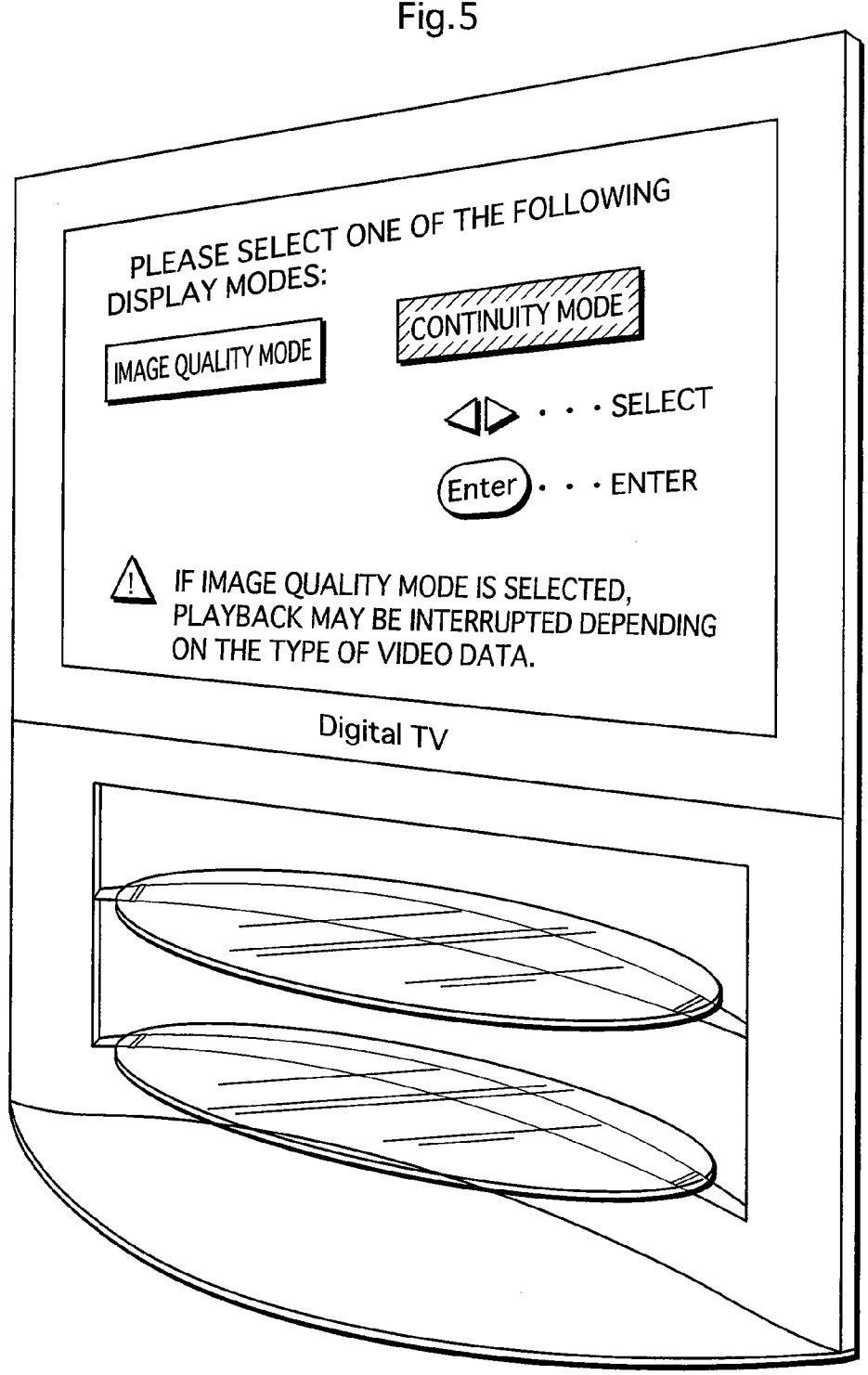
FIG. 5 shows a GUI generated by a GUI generating unit 14.

Mode setting unit 15 controls GUI generating unit 14 to generate a GUI for receiving mode settings and output the GUI to hybrid monitor 400. FIG. 5 shows a GUI generated by GUI generating unit 14. The buttons in FIG. 5 are for respectively receiving image quality mode and continuity mode settings, and may be normal, focused or activated.

"Continuity mode" is a mode that prohibits changes in frame rate during playback.

Figure 6:
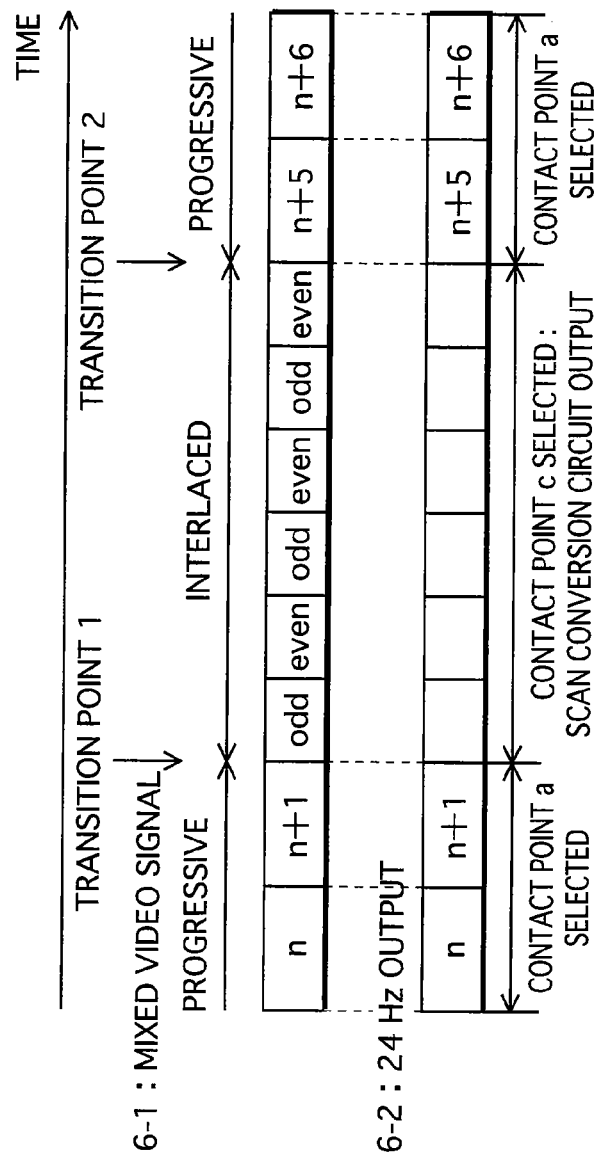
FIG. 6 shows an operation performed when switching between progressive and interlaced signals.

"Image quality mode" is a mode that permits changes in frame rate during playback. Changes in frame rate when image quality mode has been set are described below. FIG. 6 shows an operation performed at the transmission points between progressive and interlaced signals. Generally, in the case where the video signal recorded on disc 1 is film-originated material, progressive and interlaced signals are mixed together, as shown at level 6-1 in FIG. 6. This means that although the mixed signal is constituted mainly from 24 fps frames n, n+1, n+5, n+6, it is also partially constituted from an interlaced signal. Level 6-2 shows the output to digital modulation circuit 11 when the input signal is a mixed signal.

With mixed signals, an interlaced signal appears partway through the progressive signal, making it necessary for the monitor to switch sync when changing from the progressive to the interlaced signal and from the interlaced to progressive signal. For this reason, intermittent video is inevitable.

Since video can be played at the display rate of 24 Hz despite these transitions, the movements of people in a movie shot on film can be realistically reproduced. The prioritizing of image quality when image quality mode has been set means that this movement can be realistically reproduced by display performed at 24 Hz.

In FIG. 5, the user is able to switch the focused button by depressing the RIGHT or LEFT arrow keys on the remote controller. Mode setting unit 15 sets the current mode of the playback device to the mode corresponding to the currently focused button when the ENTER key is depressed. The most remarkable feature of this GUI is that it informs the user of the demerit of setting the playback device to image quality mode. The warning in FIG. 5, namely, "IF IMAGE QUALITY MODE IS SELECTED, PLAYBACK MAY BE INTERRUPTED DEPENDING ON THE TYPE OF VIDEO DATA", expresses the demerit of setting image quality mode. Given that the user is informed of the demerit of setting image quality mode, the default settings are set with continuity mode as the focused button. Since the user sets the playback device to image quality mode after being informed that display may be interrupted, in the case where progressive signals are mixed with interlaced signals, product complaints will not arise even if disruption occurs during playback due to playing the mixed signal in image quality mode.

Switch Control Circuit 16

Switch control circuit 16 controls switch 10 according to the type of video stream recorded on disc 1, the type of monitor connected to the playback device, and the mode setting in the playback device. Switch control circuit 16 is described in detail below.

Scenario 1
  peer: Hybrid Monitor 400
  mode: Image Quality

Figure 7:
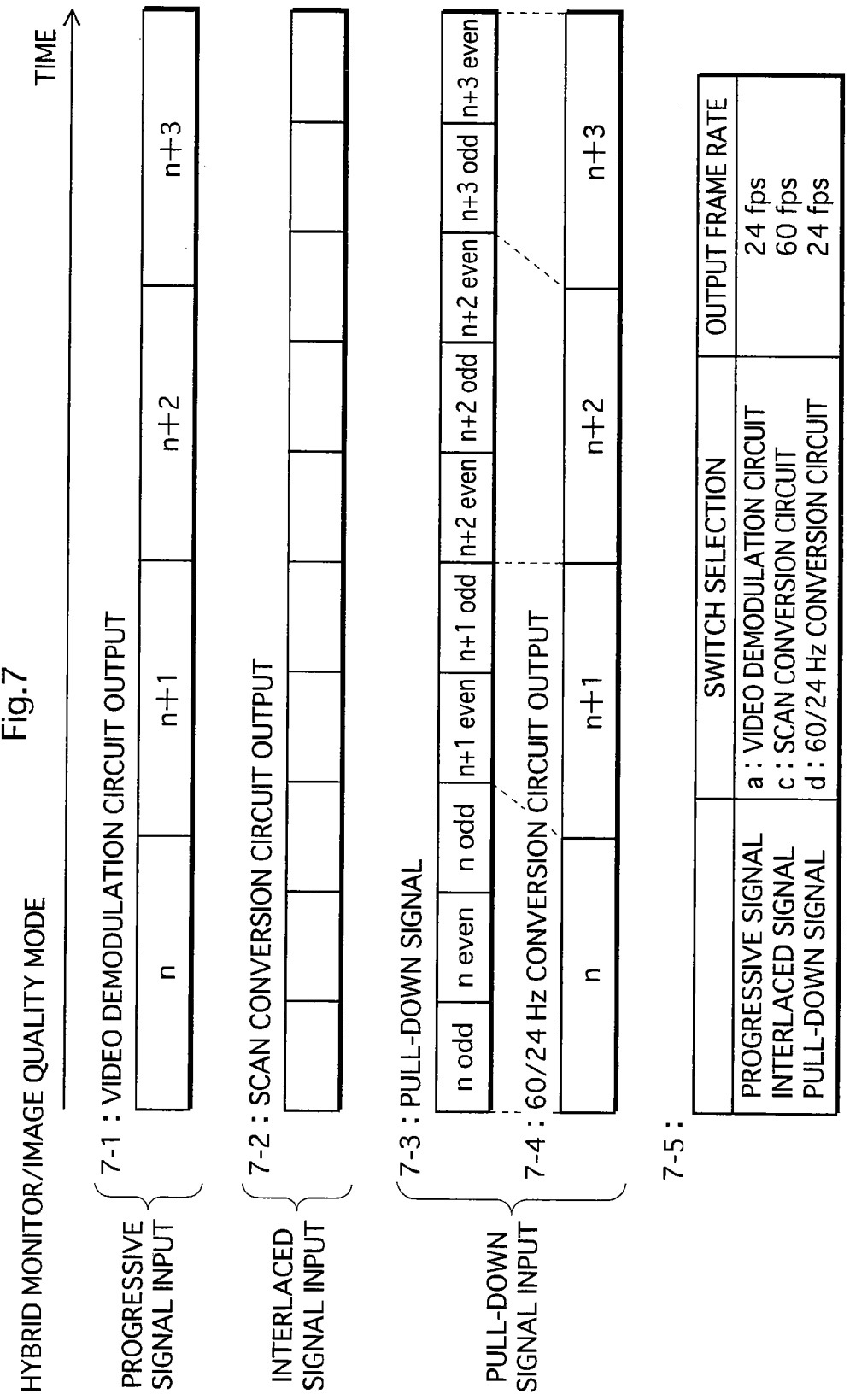
FIG. 7 shows the I/O of scan conversion circuit 8 and 60/24 Hz conversion circuit 9 in association with switching controls by a switching control circuit 16, in the case where a hybrid monitor 400 is connected and image quality mode has been set.

FIG. 7 shows the input/output (I/O) of scan conversion circuit 8 and 60/24 Hz conversion circuit 9 in association with switching controls by switching control circuit 16, in the case where hybrid monitor 400 is connected and image quality mode has been set.

Level 7-1 in FIG. 7 shows the through output of a 24 Hz progressive signal to contact point a. Level 7-2 shows the output of scan conversion circuit 8 when the input signal is an interlaced signal. Levels 7-3 and 7-4 show the I/O of 60/24 Hz conversion circuit 9 when the input signal is a pull-down signal. As shown at level 7-3, the frames constituting the original pull-down video have been converted to 60 fps video by scan conversion circuit 8. As evident from FIG. 7, a 60 Hz progressive signal is output if the input signal is an interlaced signal, but otherwise 24 Hz progressive signals are output, as shown at levels 7-1 and 7-4.

Level 7-5 shows switching controls by switch control circuit 16 when the I/O of video demodulation circuit 6, scan conversion circuit 8, and 60/24 Hz conversion circuit 9 is as shown at levels 7-1 to 7-4.

When the video signal is judged to be a progressive signal, switch control circuit 16 sets switch 10 to contact point a, and through outputs the output of video demodulation circuit 6 to digital modulation circuit 11.

When the video signal is judged to be a pull-down signal as shown at level 7-3 of FIG. 7, switch control circuit 16 sets switch 10 to contact point d, and outputs the output of 60/24 Hz conversion circuit 9 to digital modulation circuit 11, as shown at level 7-3 of FIG. 7. Accordingly, 24 fps video is output in the case where the playback device is set to image quality mode and the video signal is either a progressive signal or a pull-down signal. If the video signal is an interlaced signal, a 60 Hz progressive signal is output as a result of switch control circuit 16 setting switch 10 contact point c.

Scenario 2
  peer: Hybrid Monitor 400
  mode: Continuity

Figure 8:
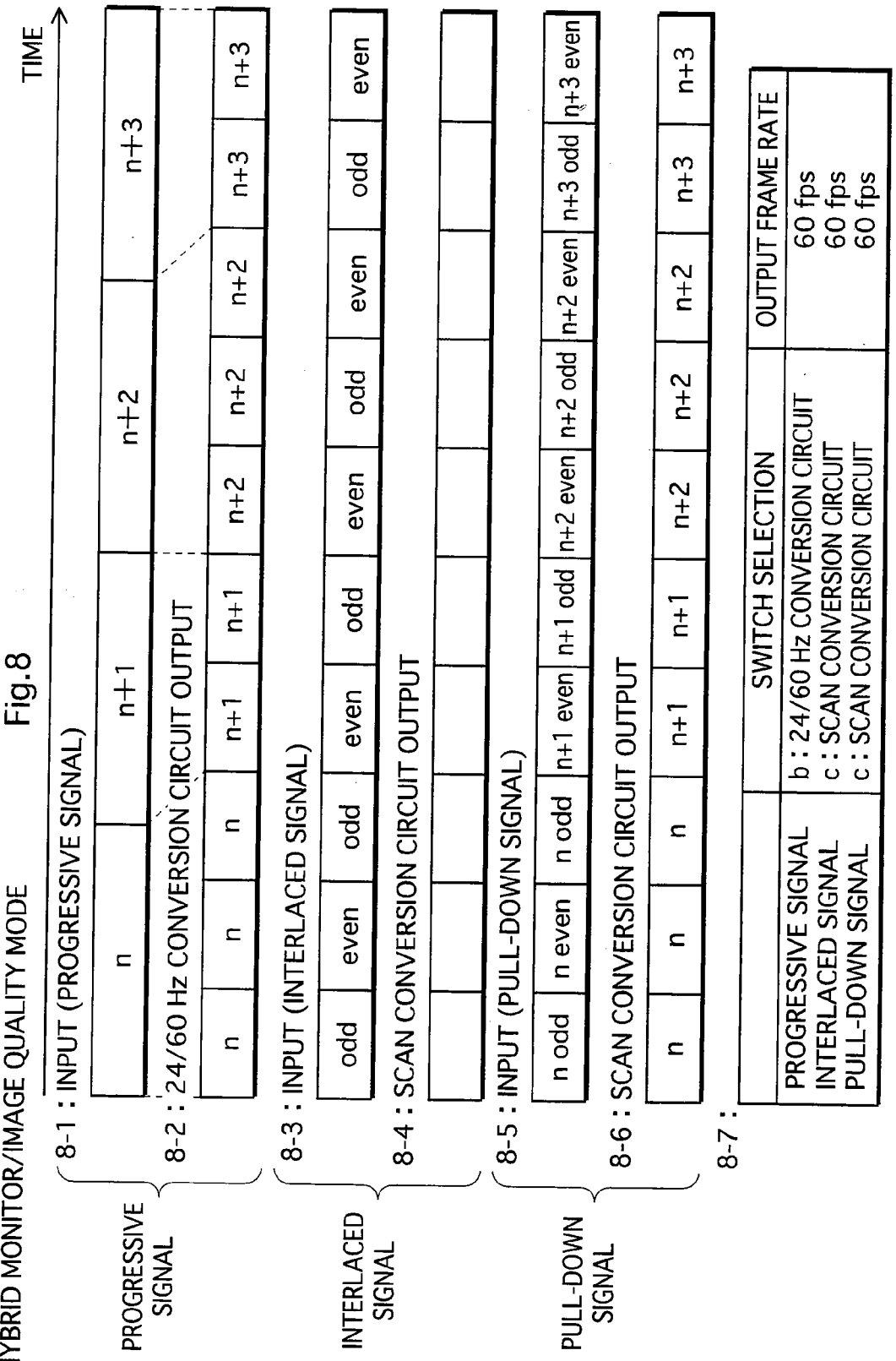
FIG. 8 shows the I/O of 24/60 Hz conversion circuit 7 and scan conversion circuit 8 in association with switching controls by switching control circuit 16, in the case where hybrid monitor 400 is connected and continuity mode has been set.

FIG. 8 shows the I/O of 24/60 Hz conversion circuit 7 and scan conversion circuit 8 in association with switching controls by switching control circuit 16, in the case where hybrid monitor 400 is connected and continuity mode has been set.

Levels 8-1 and 8-2 in FIG. 8 show the I/O of 24/60 Hz conversion circuit 7 when the input signal is a progressive signal. 24/60 Hz conversion circuit 7 converts each frame of the original 24 fps video, as shown at level 8-1, alternately into two or three frames. The result is a 60 Hz progressive signal, as shown at level 8-2. Levels 8-3 and 8-4 show the I/O of scan conversion circuit 8 when the input signal is an interlaced signal. The interlaced signal at level 8-3 is converted to a 60 Hz progressive signal, as shown at level 8-4.

Levels 8-3 and 8-4 show the I/O of scan conversion circuit 8 when the input signal is a pull-down signal. The pull-down signal at level 8-5 is converted to a 60 Hz progressive signal, as shown at level 8-6. Level 8-6 shows switching controls by switch control circuit 16 when the I/O of 24/60 Hz conversion circuit 7 and scan conversion circuit 8 is as shown at levels 8-1 to 8-6.

If the video signal is judged to be a 24 Hz progressive signal, switch control circuit 16 sets switch 10 to contact point b, and outputs the output of 24/60 Hz conversion circuit 7 to digital modulation circuit 11.

If the video signal is judged to be an interlaced signal or a pull-down signal, switch control circuit 16 sets switch 10 to contact point c, and outputs the output of scan conversion circuit 8 to digital modulation circuit 11. Accordingly, input to digital modulation circuit 11 is always 60 fps video.

Scenario 3
peer: 60 Hz Monitor 500

Figure 9:
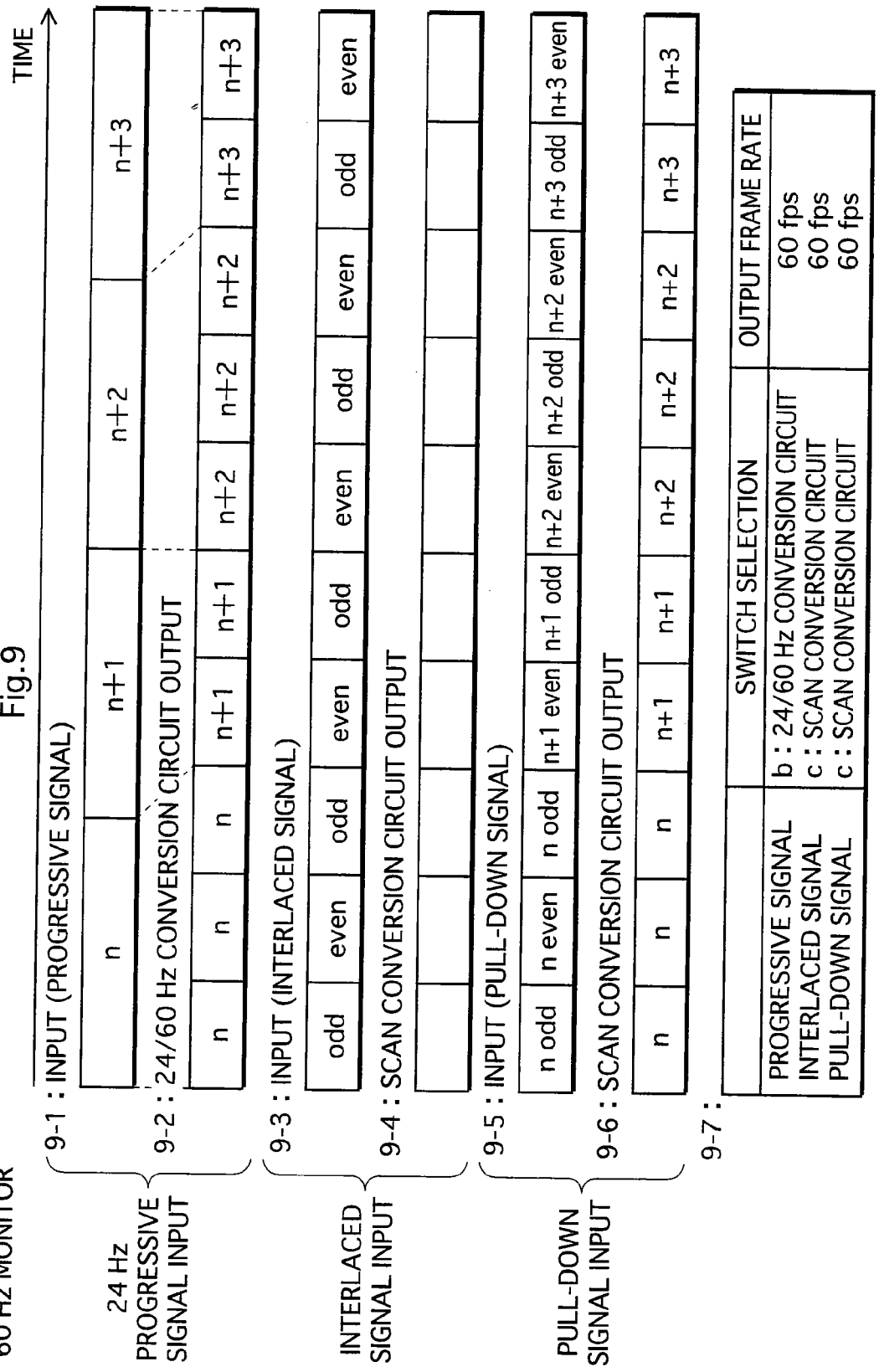
FIG. 9 shows the I/O of 24/60 Hz conversion circuit 7 and scan conversion circuit 8 in association with switching controls by switching control circuit 16, in the case where a 60 Hz monitor 500 is connected.

FIG. 9 shows the I/O of 24/60 Hz conversion circuit 7 and scan conversion circuit 8 in association with switching controls by switching control circuit 16, in the case where 60 Hz monitor 500 is connected.

Levels 9-1 and 9-2 in FIG. 9 show the I/O of 24/60 Hz conversion circuit 7 when the input signal is a progressive signal. 24/60 Hz conversion circuit 7 converts each frame of the original 24 fps video, as shown at level 9-1, alternately into two or three frames. The result is a 60 Hz progressive signal, as shown at level 9-2. Levels 9-3 and 9-4 show the I/O of scan conversion circuit 8 when the input signal is an interlaced signal. The interlaced signal at level 9-3 is converted to a 60 Hz progressive signal, as shown at level 9-4.

Levels 9-3 and 9-4 show the I/O of scan conversion circuit 8 when the input signal is a pull-down signal. The pull-down signal at level 9-5 is converted to a 60 Hz progressive signal, as shown at level 9-6. Level 9-6 shows switching controls by switch control circuit 16 when the I/O of 24/60 Hz conversion circuit 7 and scan conversion circuit 8 is as shown at levels 9-1 to 9-6.

If the video signal is judged to be a 24 Hz progressive signal, switch control circuit 16 sets switch 10 to contact point b, and outputs the output of 24/60 Hz conversion circuit 7 to digital modulation circuit 11.

If the video signal is an interlaced signal or a pull-down signal, switch control circuit 16 sets switch 10 to contact point c, and outputs the output of scan conversion circuit 8 to digital modulation circuit 11. Accordingly, input to digital modulation circuit 11 is always 60 fps video.

Therefore, since 60 fps video is output when continuity mode has been set, irrespective of whether switching is made to progressive, interlaced or pull-down signals, intermittent video is avoided because sync is not switched at the monitor.

Accordingly, the user, by selecting image quality mode when they want playback with image quality prioritized, and selecting continuity mode when they want playback with video continuity prioritized, is able to select video output that meets these needs.

The use of software to implement display capacity judging unit 13, GUI generating unit 14, mode setting unit 15, and switch control circuit 16 is described below. Display capacity judging unit 13, GUI generating unit 14, mode setting unit 15, and switch control circuit 16 can be implemented within the playback device by creating a computer program that performs the processing of FIG. 10 and having a CPU execute the program.

Figure 10:
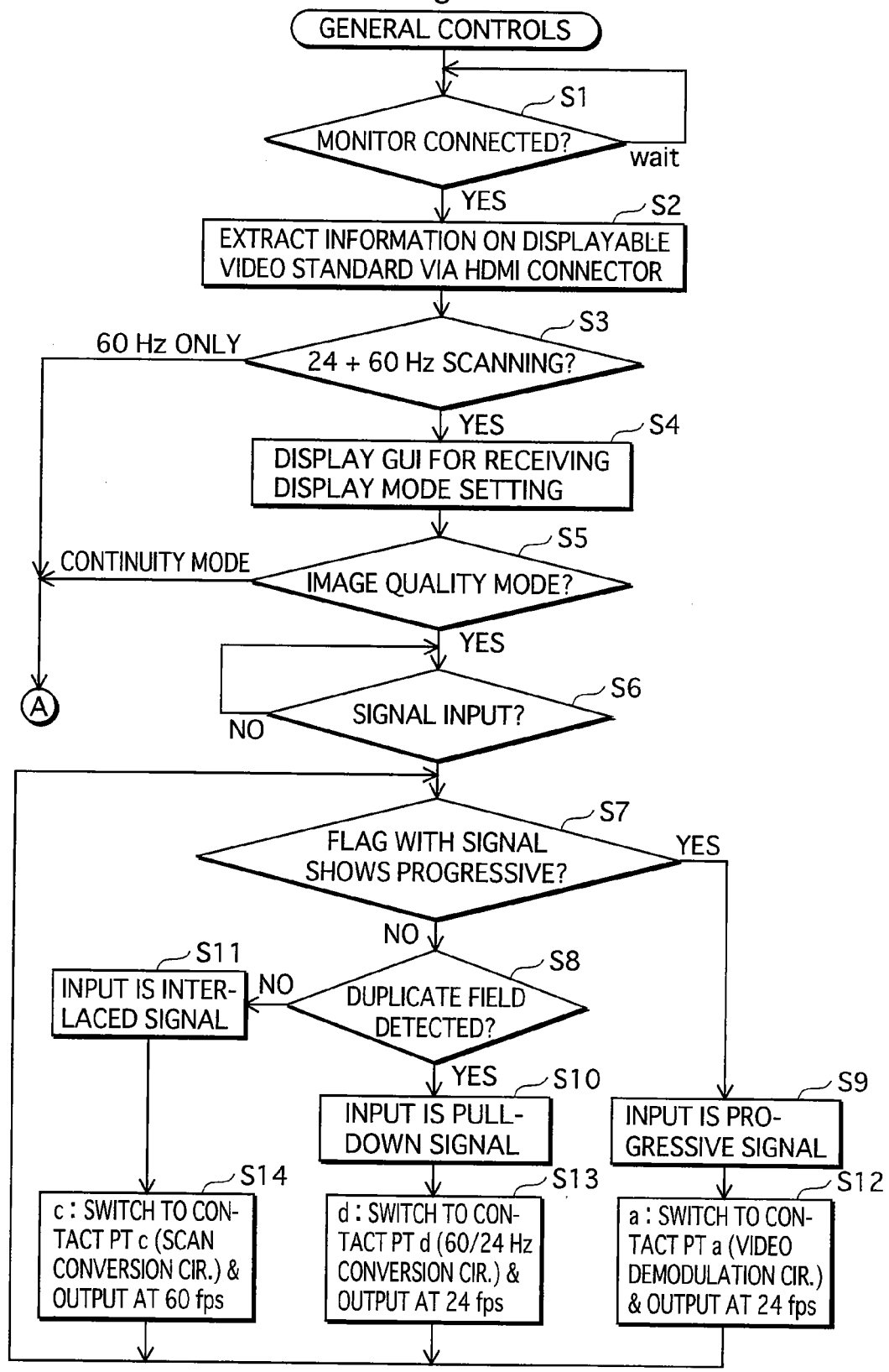
FIG. 10 is a flowchart showing general control procedures of the playback device performed by a display capacity judging unit 13, GUI generating unit 14, a mode setting unit 15, and switching control circuit 16.

FIG. 10 is a flowchart showing general control procedures of the playback device performed by display capacity judging unit 13, GUI generating unit 14, mode setting unit 15, and switching control circuit 16. In FIG. 10, the step 1 loop is performed when the playback device is started up. Step 1 involves judging whether a monitor is connected. If judged that a monitor is connected, processing moves to step 2. Step 2 involves processing to extract information on displayable video standards from the monitor via HDMI. Step 3 involves judging whether to execute the processing of steps 4 to 14 or whether to execute the processing of steps 16 to 24, based on the extracted information on displayable video standards.

Figure 11:
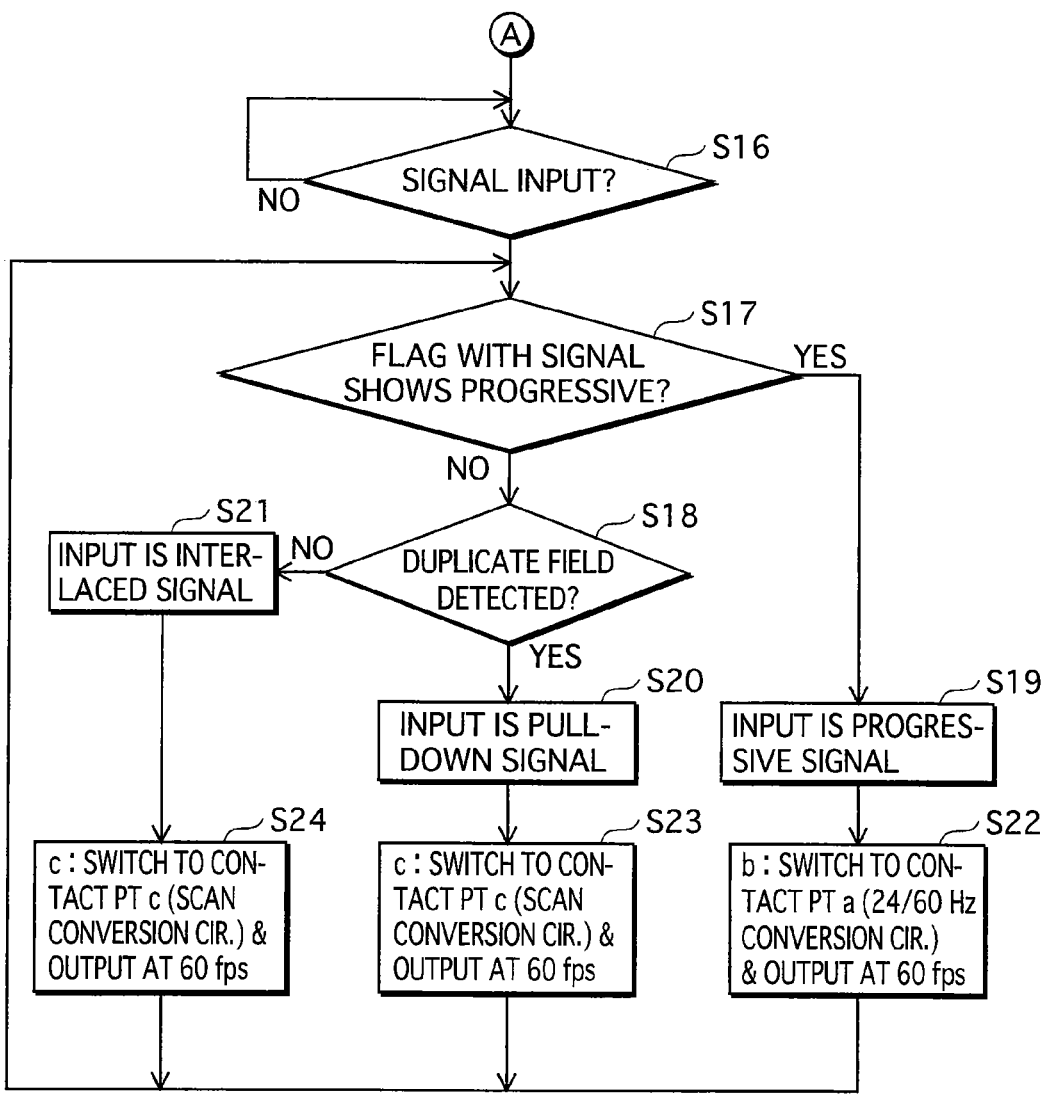
FIG. 11 is a flowchart showing processing procedures of the playback device performed in the case where either 60 Hz monitor 500 is connected or continuity mode has been set.

If the connected monitor is only capable of 60 Hz scanning, processing moves to the FIG. 11 flowchart. If the connected monitor is capable of both 24 Hz and 60 Hz scanning, processing moves to steps 4 to 14.

Step 4 involves receiving either the image quality mode setting or the continuity mode setting, in the case where the monitor is capable of both 24 Hz and 60 Hz scanning. Step 5 involves judging which of these modes the playback device has been set to. Processing moves to FIG. 11 if the playback device has been set to continuity mode. Processing moves to steps 6 to 14 if the playback device has been set to image quality mode.

Steps 6 to 14, which constitute processing that forms the gist of the present embodiment, involve switching switch 10 to contact point a (step 12), contact point d (step 13), or contact point c (step 14), according to the results of steps 6 to 11.

Which of steps 12 to 14 to execute is decided in accordance with the judgment results of steps 7 and 8.

Step 6, which is executed prior to steps 7 and 8, is a loop that involves waiting for input of a video signal. Processing moves to step 7 when a video signal is input.

Step 7 involves controlling video discrimination circuit 5 to judge whether the flags accompanying the video signal indicate progressive scanning. If the flags indicate progressive scanning, the input signal is recognized at step 9 as being a progressive signal, and processing moves to step 12. If the flags indicate interlaced scanning, processing moves to step 8. Step 8 involves controlling video discrimination circuit 5 to judge whether duplicate fields exist in the input signal. If duplicate fields exist, the input signal is recognized at step 10 as being a pull-down signal, and processing moves to step 13.

If duplicate fields do not exist, the input signal is recognized at step 10 as being an interlaced signal, and processing moves to step 14. Steps 7 to 14 are repeated as long as video signals continue to be input. This concludes description the FIG. 10 flowchart.

FIG. 11 is a flowchart showing processing procedures of the playback device performed in the case where either 60 Hz monitor 500 is connected or continuity mode has been set.

The flowchart executes processing for switching switch 10 to contact point b (step 22), contact point c (step 23) or contact point c (step 24), according to the results of steps 16 to 21.

Which of steps 22 to 24 to execute is decided in accordance with the judgment results of steps 17 and 18.

Step 16, which is executed prior to steps 17 and 18, is a loop that involves waiting for input of a video signal. Processing moves to step 17 when a video signal is input.

Step 17 involves controlling video discrimination circuit 5 to judge whether the flags accompanying the video signal indicate progressive scanning. If the flags indicate progressive scanning, the input signal is recognized at step 19 as being a progressive signal, and processing moves to step 22. If the flags indicate interlaced scanning, processing moves to step 18. Step 18 involves controlling video discrimination circuit 5 to judge whether duplicate fields exist in the input signal. If duplicate fields exist, the input signal is recognized at step 20 as being a pull-down signal, and processing moves to step 23.

If duplicate fields do not exist, the input signal is recognized at step 20 as being an interlaced signal, and processing moves to step 24. Steps 17 to 24 are repeated as long video signals continue to be input. This concludes description the FIG. 11 flowchart.

In the present embodiment as described above, the playback device detects differences in the frame rates of video signals being played back and differences in the displayable frame rates of connected monitors, and is able to change the frame rate of output signals according to the detection results, and to receive a user selection of whether to display video with priority given to the quality of picture or with priority given to uninterrupted playback. Accordingly, the advantage of the present embodiment lies in being able to eliminate the problem of images not being displayed, or optimal image quality not being achieved, or display being interrupted, by matching the frame rates of the video signals with the displayable frame rate/s of the monitor.

Embodiment 2

Embodiment 2 assumes that the monitor is multiscan. A multiscan monitor is a monitor that performs display at a scan rate specified by the playback device. In the present embodiment, the multiscan monitor is made to perform video playback by scanning at 48 Hz, this rate being an integer multiple of 24 Hz. Film material is suited to display at 24 fps as described in embodiment 1, although the possibility of flicker exists at this frame rate. With film projectors in movie theaters designed to avoid flicker, each frame is projected twice. Thus, by having the playback device in the present embodiment performs video display at 48 fps, display quality comparable to that of a movie theater is achieved.

Figure 12:
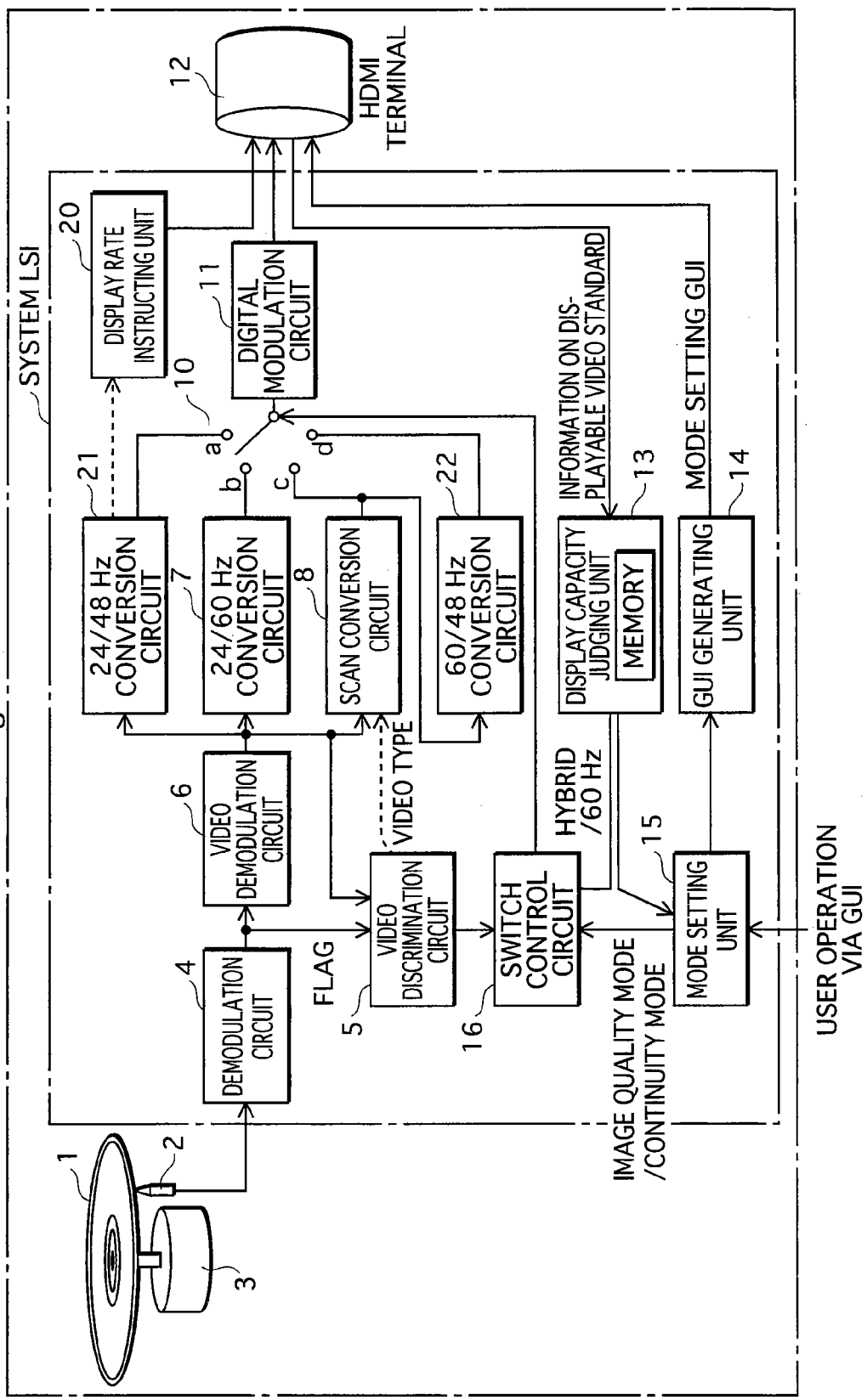
FIG. 12 shows an internal structure of a playback device pertaining to an embodiment 2.

The internal structure of a playback device pertaining embodiment 2 is described below. FIG. 12 shows the internal structure of a playback device pertaining to embodiment 2. As shown in FIG. 12, the playback device pertaining to embodiment 2 additionally includes a display rate instructing unit 20 and a 24/48 Hz conversion circuit 21, while 60/24 Hz conversion circuit 9 has been replaced by a 60/48 Hz conversion circuit 22. Because of the addition of these constituent elements, display capacity judging unit 13 and switch control circuit 16 perform the following processing particular to embodiment 2. These improvements and additional constituent elements are described below.

Improvement to Display Capacity Judging Unit 13

Display capacity judging unit 13 extracts information on displayable video standards from the ROM provided in the connected monitor via the serial transmission line, and judges whether the monitor is multiscan based on the extracted information.

Display Rate Instructing Unit 20

Display rate instructing unit 20 notifies a scan rate to the connected monitor via HDMI, if display capacity judging unit 13 judges the monitor to be multiscan. This scan rate is the aforementioned 48 fps. Having instructed the monitor to perform display at 48 fps, display rate instructing unit 20 controls 24/48 Hz conversion circuit 21 and 60/48 Hz conversion circuit 22 to perform signal output at 48 fps if image quality mode has been set.

24/48 Hz Conversion Circuit 21

Figure 13:
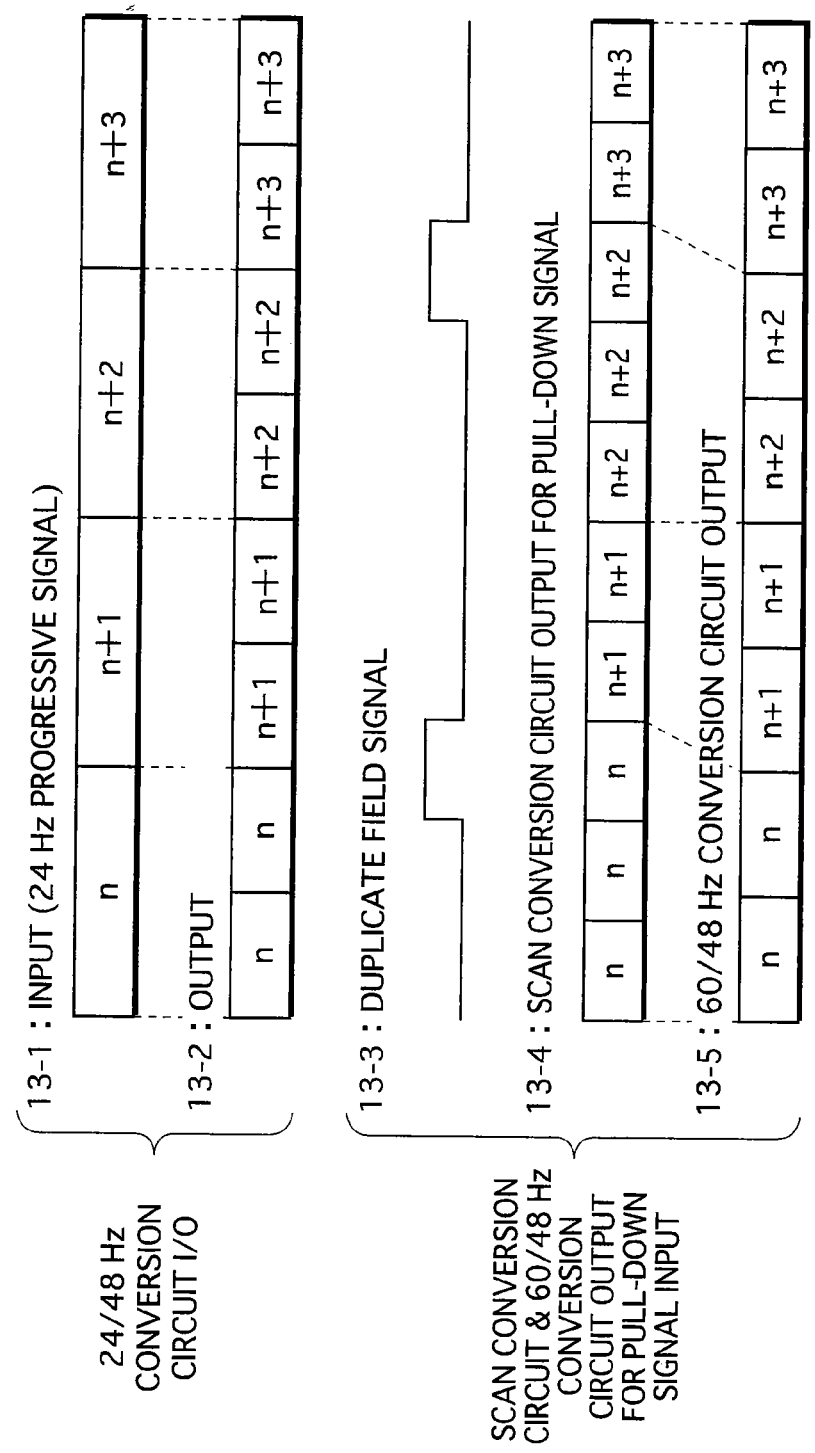
FIG. 13 shows the I/O of a 24/48 Hz conversion circuit 21 and a 60/48 Hz conversion circuit 22.

24/48 Hz conversion circuit 21 converts 24 fps progressive signals output from video demodulation circuit 6 to 48 fps. FIG. 13 shows the I/O of 24/48 Hz conversion circuit 21 and 60/48 Hz conversion circuit 22. Level 13-1 in FIG. 13 shows the input signal (24 Hz progressive signal) to 24/48 Hz conversion circuit 21, while level 13-2 shows the output signal from 24/48 Hz conversion circuit 21. As evident from FIG. 13, frames n, n, n+1, n+1, n+2, n+2 are generated from frames n, n+1, n+2 constituting the progressive signal at level 13-1.

60/48 Hz Conversion Circuit 22

60/48 Hz conversion circuit 22 converts 60 Hz progressive signals output from scan conversion circuit 8 to 48 fps for output. Levels 13-3 to 13-5 in FIG. 13 show the I/O of 60/48 Hz conversion circuit 22 expressed in the same notation as levels 4-3 to 4-5 in FIG. 4. As evident from FIG. 13, two frames n, n are output from the three fields n, n, n in the pull-down signal, and two frames n+1, n+1 are output from the two fields n+1, n+1 in the pull-down signal.

Improvement to Switch Control Circuit 16

Figure 14:
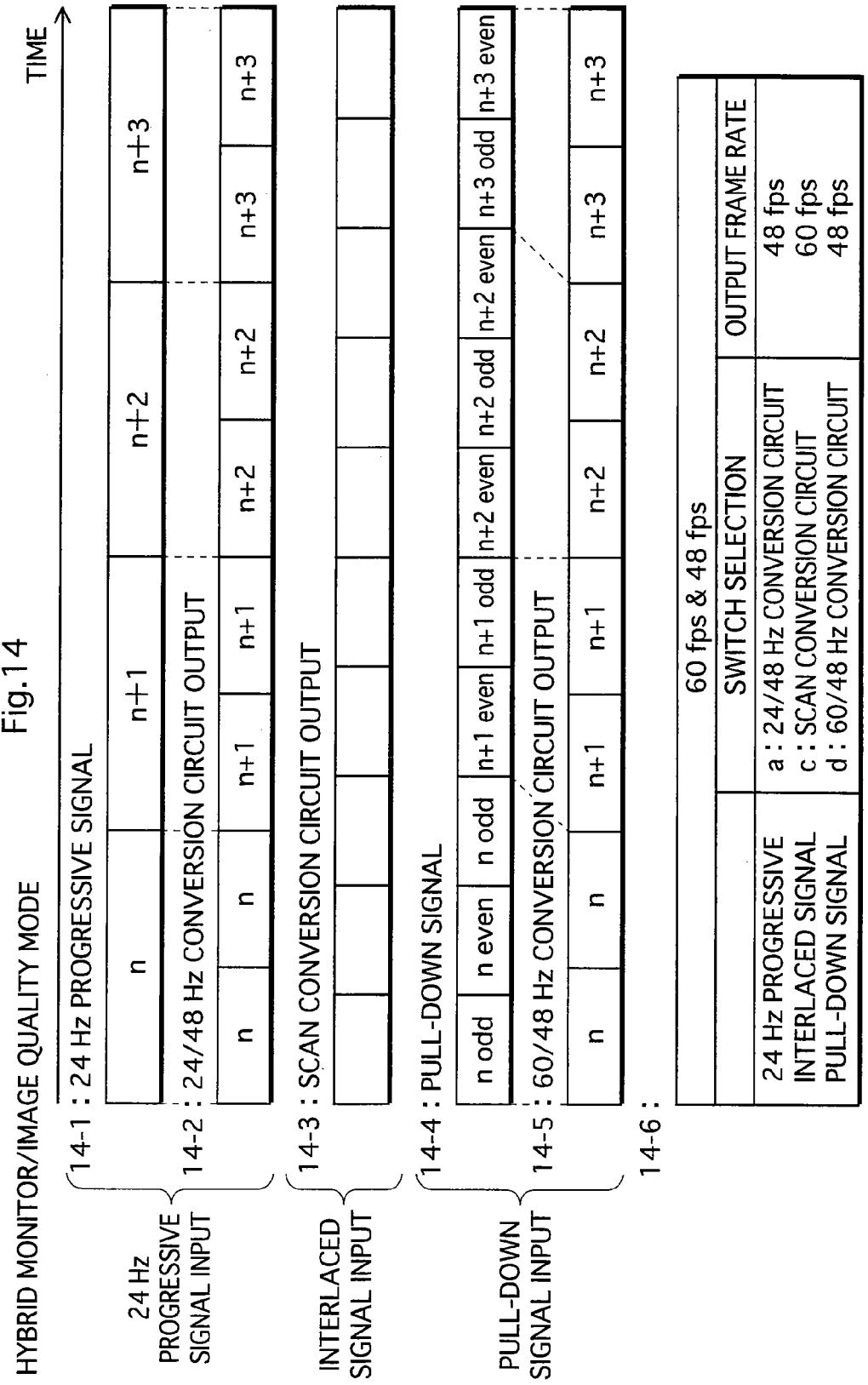
FIG. 14 shows the I/O of 24/48 Hz conversion circuit 21, scan conversion circuit 8, and 60/48 Hz conversion circuit 22 in association with switching controls by switching control circuit 16, in the case where hybrid monitor 400 is connected and image quality mode has been set.

Switch control circuit 16 controls the switching of switch 10 as shown in FIG. 14 when the playback device is set to image quality mode, since 24/48 Hz conversion circuit 21 and 60/48 Hz conversion circuit 22 output at 48 fps when the input signal is a progressive signal or a pull-down signal.

FIG. 14 shows the I/O of 24/48 Hz conversion circuit 21, scan conversion circuit 8, and 60/48 Hz conversion circuit 22 in association with switching controls by switching control circuit 16, in the case where a multiscan monitor is connected and image quality mode has been set. Levels 14-1 and 14-2 in FIG. 14 show the I/O of 24/48 Hz conversion circuit 21 when the input signal is a 24 Hz progressive signal. Level 14-3 shows the output of scan conversion circuit 8 when the input signal is an interlaced signal. Levels 14-4 and 14-5 show the I/O of 60/48 Hz conversion circuit 22 when the input signal is a pull-down signal. As evident from FIG. 14, a 60 Hz progressive signal is output when the input signal is an interlaced signal, but otherwise 48 Hz progressive signals are output, as shown at levels 14-2 and 14-5.

Level 14-2 shows switching controls by switch control circuit 16 in the case where the I/O of 24/48 Hz conversion circuit 21, scan conversion circuit 8, and 60/48 Hz conversion circuit 22 is as shown at levels 14-1 to 14-5.

When the video signal is judged to be a progressive signal, switch control circuit 16 sets switch 10 to contact point a, and outputs the output of 24/48 Hz conversion circuit 21 to digital modulation circuit 11.

If the video signal is a pull-down signal as shown at level 14-4 in FIG. 14, switch control circuit 16 sets switch 10 to contact point d, and outputs the output of 60/48 Hz conversion circuit 22 to digital modulation circuit 11. Accordingly, a 48 fps progressive signal is output in the case where image quality mode is set and the video signal is a progressive signal or a pull-down signal. If the video signal is an interlaced signal, a 60 fps progressive signal is output as a result of switch control circuit 16 setting switch 10 to contact point c.

Figure 15:
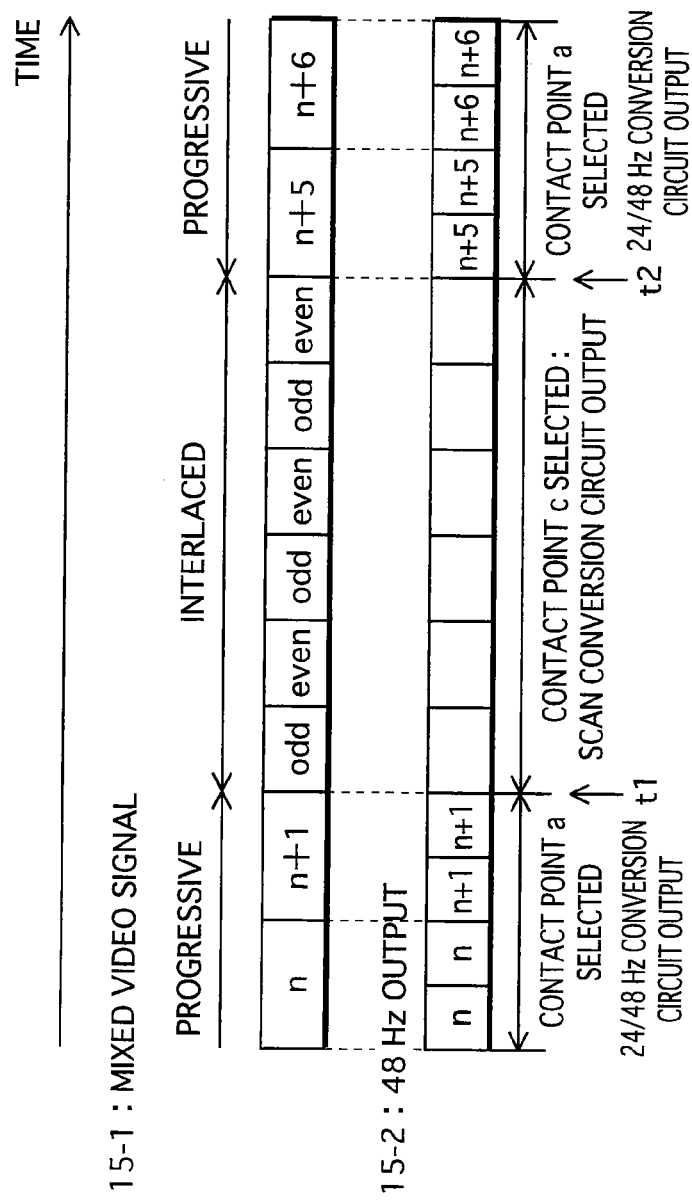
FIG. 15 shows an operation performed when switching between progressive and interlaced signals.

FIG. 15 shows an operation performed when changing between progressive and interlaced signals. Generally, if the video signal recorded on disc 1 is movie material shot on film, progressive and interlaced signals are often mixed together, as shown at level 15-1 in FIG. 15. This means that although the mixed signal is constituted mainly from 24 fps frames n, n+1, n+5, n+6, it is also partially constituted from an interlaced signal.

With mixed signals, an interlaced signal appears partway through the progressive signal, making it necessary for the monitor to switch sync when changing from the progressive to the interlaced signal and from the interlaced to progressive signal. For this reason, intermittent video is inevitable.

Accordingly, the processing in embodiment 1 is necessary even when the playback device performs output at 48 fps. In other words, even when the connected monitor is multiscan, mode setting unit 15 controls GUI generating unit 14 to generate a mode setting GUI as shown in FIG. 5, and if the user sets image quality mode despite the warning, signal output is performed at 48 fps.

In the present embodiment, the playback device is able to indulge the user with playback quality comparable to that of a movie theater by controlling the monitor to display at 48 fps. Furthermore, the risk of product complaints if display is interrupted or disrupted when mixed signals are played is avoided, by only permitting the user to select playback at 48 fps after warning them of the demerit of selecting image quality mode.

Embodiment 3

Embodiment 3 assumes that the monitor is multiscan, similarly to embodiment 2. A multiscan monitor is a monitor that performs display at a scan rate specified by the playback device. In the present embodiment, the multiscan monitor is made to perform video playback by scanning at 72 Hz, this rate being an integer multiple of 24 Hz.

Figure 16:
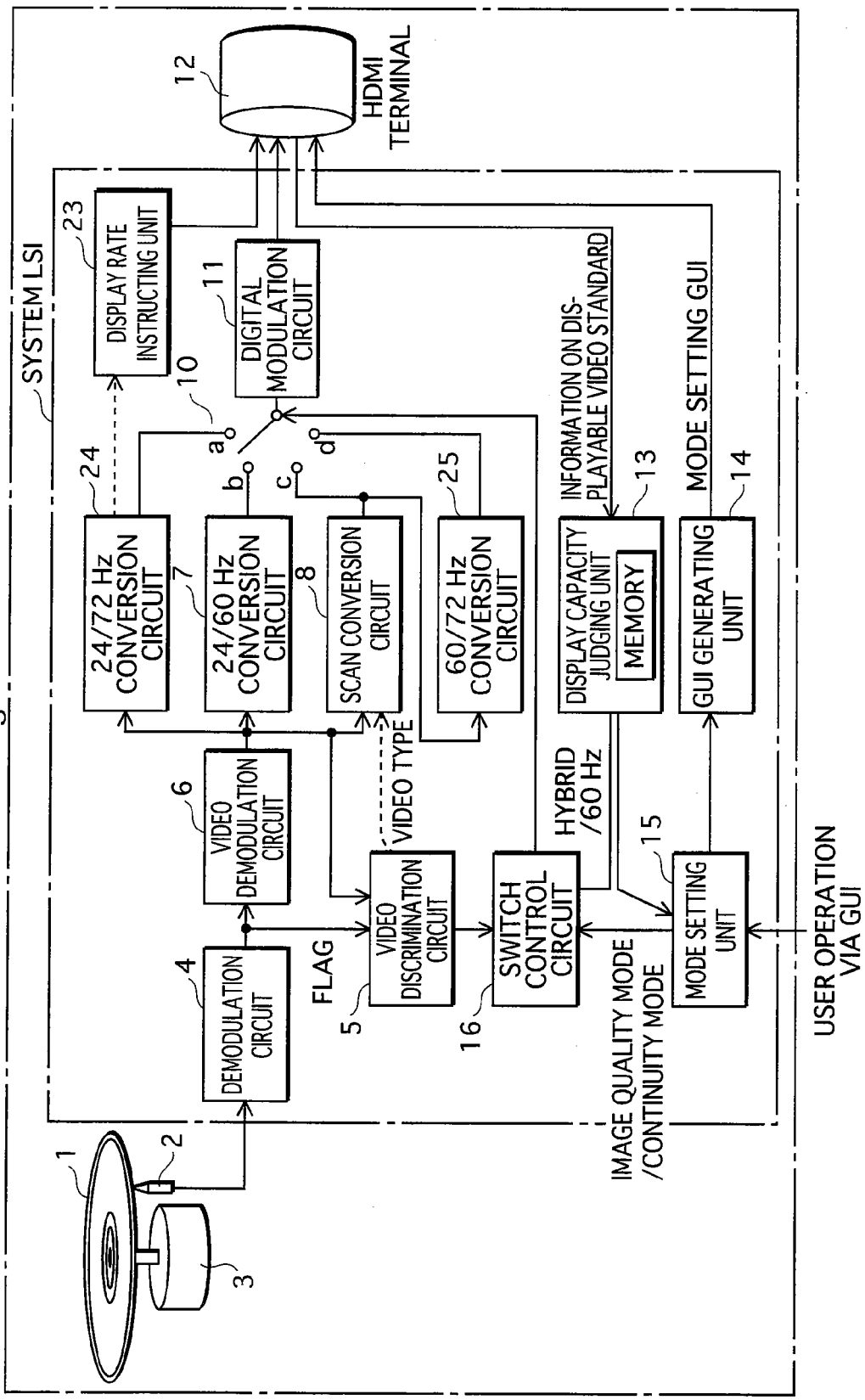
FIG. 16 shows an internal structure of a playback device pertaining to an embodiment 3.

The internal structure of a playback device pertaining embodiment 3 is described below. FIG. 16 shows the internal structure of a playback device pertaining to embodiment 3. FIG. 16 is based on the internal structure of the playback device pertaining to embodiment 2, as shown in FIG. 12. A difference with FIG. 12 lies in the fact that in the playback device pertaining to embodiment 3, 24/48 Hz conversion circuit 21, 60/48 Hz conversion circuit 22, and display rate instructing unit 20 have been replaced by a 24/72 Hz conversion circuit 24, a 60/72 Hz conversion circuit 25, and a display rate instructing unit 23. Because of these improvements and additional constituent elements, display capacity judging unit 13 and switch control circuit 16 perform the following processing particular to embodiment 3. These improvements and additional constituent elements are described below.

Improvement to Display Capacity Judging Unit 13

Display capacity judging unit 13 extracts information on displayable video standards from the ROM provided in the connected monitor via the serial transmission line, and judges whether the monitor is multiscan, based on the extracted information.

Display Rate Instructing Unit 23

Display rate instructing unit 23 notifies a scan rate of 72 fps to the connected monitor via HDMI, if display capacity judging unit 13 judges the monitor to be multiscan. Having instructed the monitor to perform display at 72 fps, display rate instructing unit 23 controls 24/72 Hz conversion circuit 24 and 60/72 Hz conversion circuit 25 to perform signal output at 72 fps if image quality mode has been set.

24/72 Hz Conversion Circuit 24

Figure 17:
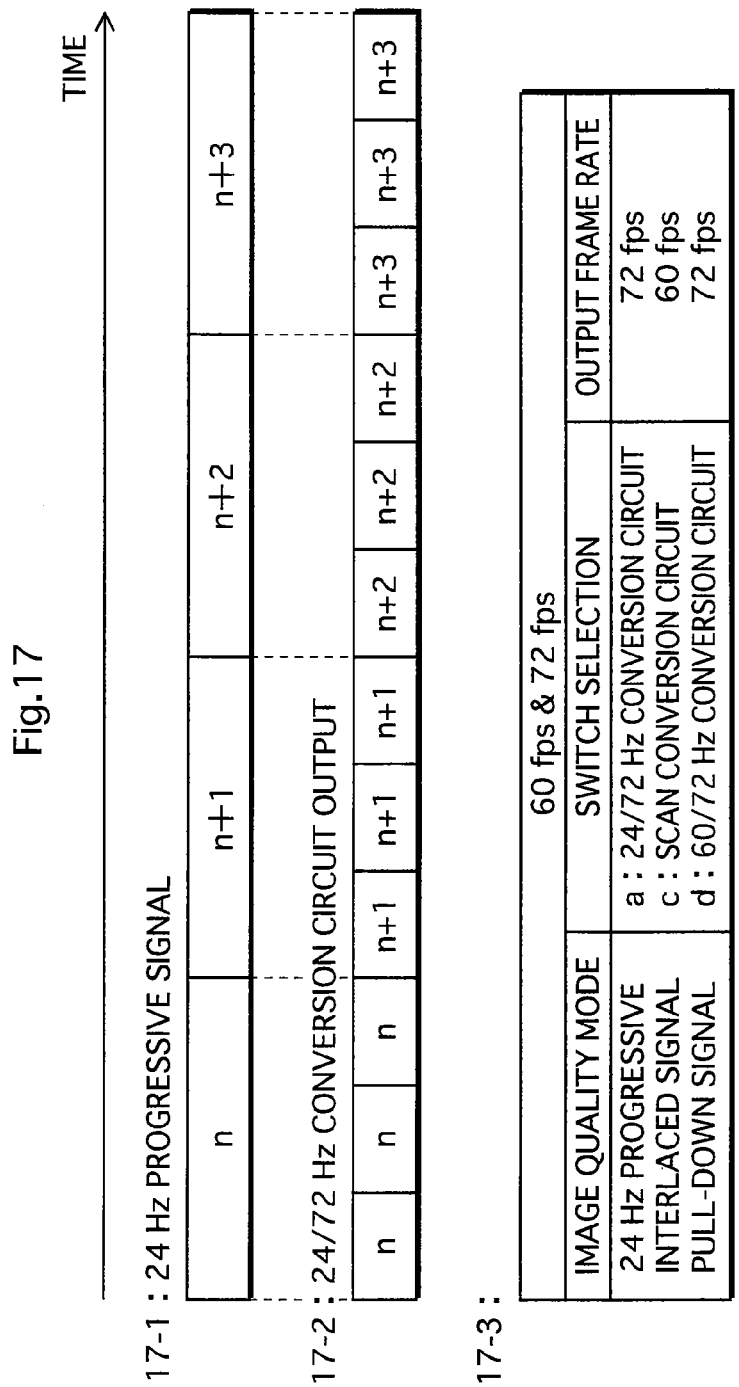
FIG. 17 shows the I/O of a 24/72 Hz conversion circuit 24.

24/72 Hz conversion circuit 24 converts 24 fps progressive signals output from video demodulation circuit 6 to 72 fps. FIG. 17 shows the I/O of 24/72 Hz conversion circuit 24. Level 17-1 in FIG. 17 shows the input signal (24 Hz progressive signal) to 24/72 Hz conversion circuit 24, while level 17-2 shows the output signal from 24/72 Hz conversion circuit 24. As evident from FIG. 17, frames n, n, n, n+1, n+1, n+1, n+2, n+2, n+2 are generated from frames n, n+1, n+2 constituting the progressive signal at level 17-1.

60/72 Hz Conversion Circuit 25

60/72 Hz conversion circuit 25 converts 60 Hz progressive signals output from scan conversion circuit 8 to 72 fps for output.

This completes description of 24/72 Hz conversion circuit 24 and 60/72 Hz conversion circuit 25. Switch control circuit 16 executes the following switching as a result of 24/48 Hz conversion circuit 21 and 60/48 Hz conversion circuit 22 having been replaced by 24/72 Hz conversion circuit 24 and 60/72 Hz conversion circuit 25.

Switch Control Circuit 16

Switch control circuit 16 controls the switching of switch 10 as shown at level 17-3 in FIG. 17 in embodiment 3. Level 17-3 shows switching controls by switch control circuit 16 pertaining to embodiment 3.

When the playback device has been set to image quality mode, and the input signal is judged to be a progressive signal, switch control circuit 16 sets switch 10 to contact point a, and outputs the output of 24/72 Hz conversion circuit 24 to digital modulation circuit 11. This results in a 72 fps video signal being output to the monitor.

When the playback device has been set to image quality mode, and the input signal is judged to be a pull-down signal, switch control circuit 16 sets switch 10 to contact point d, and outputs the output of 60/72 Hz conversion circuit 25 to digital modulation circuit 11.

Accordingly, a 72 fps progressive signal is sent to the monitor in the case where image quality mode is set and the video signal is a progressive signal or a pull-down signal. If the video signal is an interlaced signal, a 60 fps progressive signal is output as a result of switch control circuit 16 setting switch 10 to contact point c.

In the present embodiment as described above, the playback device is able to control the connected monitor to perform display at 72 fps. Moreover, the risk of product complaints can be avoided even when display is interrupted or disrupted, in the case where the signal is a mixed signal that mixes progressive and interlaced signals.

Embodiment 4

Figure 18:
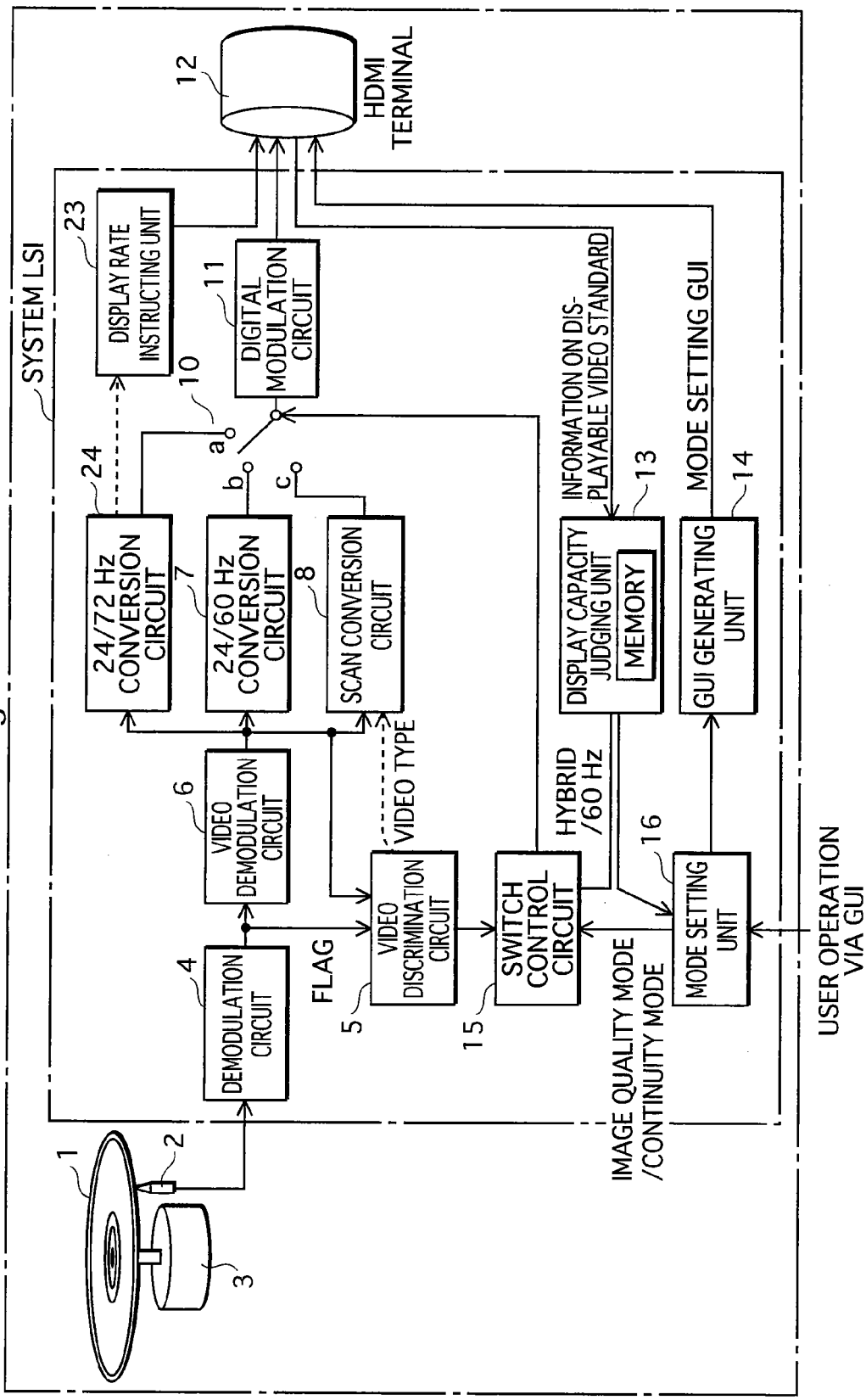
FIG. 18 shows an internal structure of a playback device pertaining to an embodiment 4.

The present embodiment is an improvement that simplifies the circuitry of the playback device shown in embodiment 3. FIG. 18 shows an internal structure of a playback device pertaining to embodiment 4. 60/72 Hz conversion circuit 25 has been omitted from the internal structure of the playback device shown in embodiment 3, as evident from FIG. 18. In other words, 60/72 Hz conversion circuit 25 has been omitted due to the large circuitry structure for realizing conversion to 72 fps.

Figure 19:
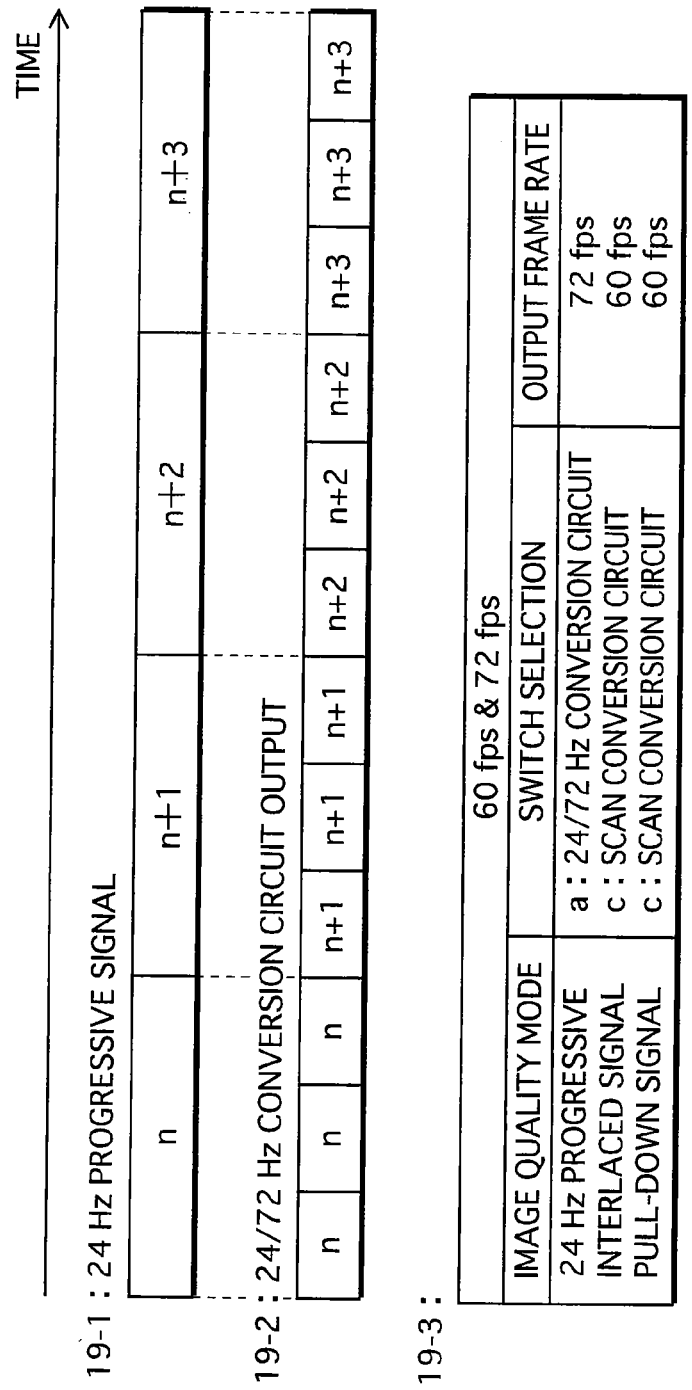
FIG. 19 shows the I/O of 24/72 Hz conversion circuit 24 and switching controls by switching control circuit 16.

FIG. 19 shows the I/O of 24/72 Hz conversion circuit 24 and switching controls on switch 10 by switching control circuit 16. Levels 19-1 and 19-2 in FIG. 19 show the I/O of 24/72 Hz conversion circuit 24. This I/O is the same as that shown in embodiment 3.

Level 19-3 shows the switching controls by switching control circuit 16.

When the video signal is judged to be a progressive signal, switch control circuit 16 sets switch 10 to contact point a, and outputs the output of 24/72 Hz conversion circuit 24 to digital modulation circuit 11. If the video signal is an interlaced signal, a 60 fps progressive signal is output as a result of switch control circuit 16 setting switch 10 to contact point c.

If the video signal is a pull-down signal, a 60 fps progressive signal is output as a result of switch control circuit 16 setting switch 10 to contact point c.

In the present embodiment as described above, the structure of the playback device can be simplified by omitting 60/72 Hz conversion circuit 25, making it possible to reduce manufacturing costs when the playback device is manufactured.

Embodiment 5

Figure 20:
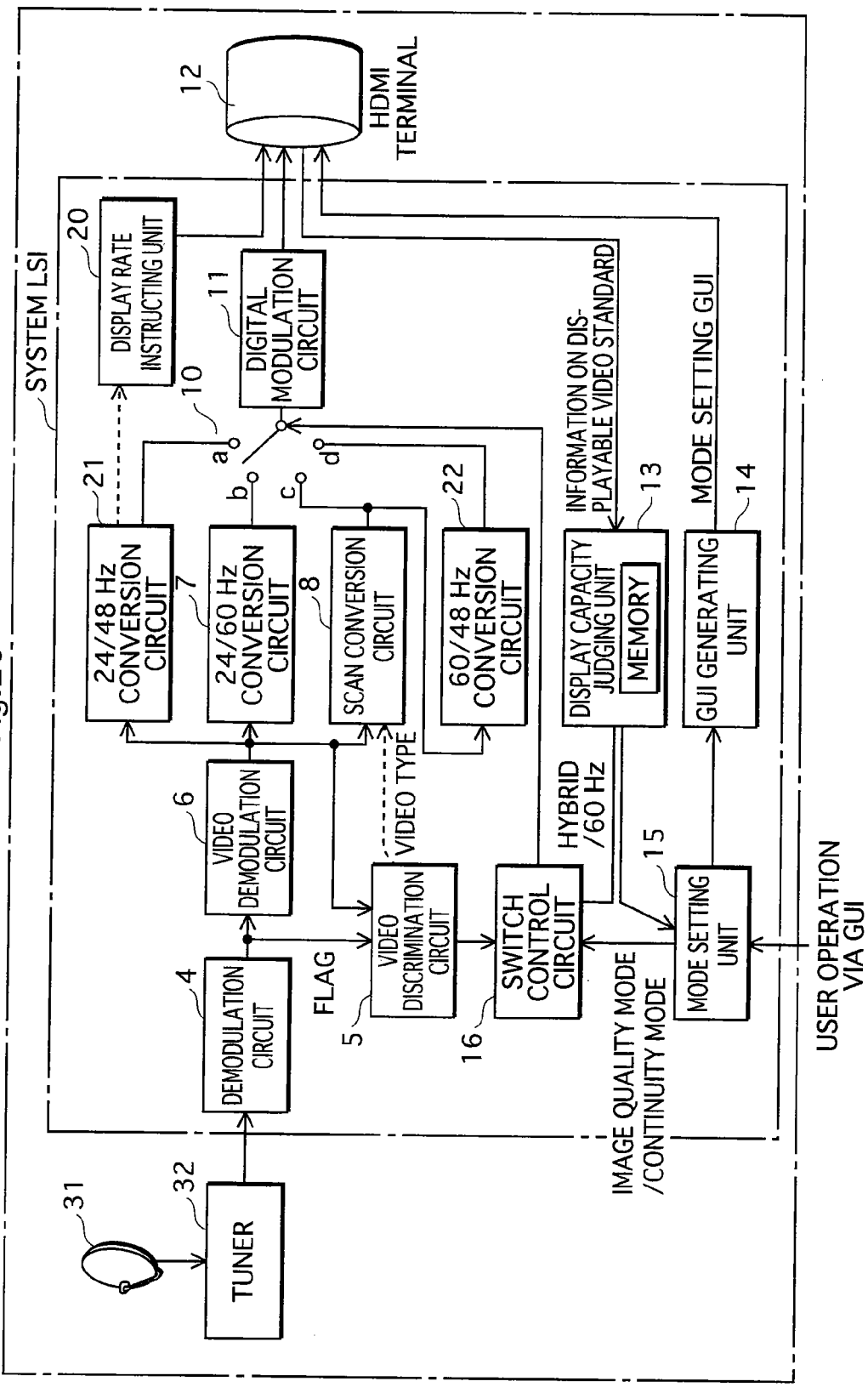
FIG. 20 shows an internal structure of a playback device in the case where the video signal is input from a transmission medium.

Embodiments 1 to 4 describe optical disc 1 as being the input source of the video signal. Embodiment 5 concerns an improvement in the case where the input source of the video signal is a broadcast wave. FIG. 20 shows an internal structure of a playback device in the case where the input source of the video signal is a transmission medium. A comparison of FIG. 20 with the internal structure diagrams of embodiments 1 to 4 reveals that disc 1, optical pickup 2, and motor 3 have been replaced with a receiving antenna 31 and a tuner 32. The inclusion of antenna 31 and tuner 32 constitutes the improvement of the present embodiment.

Receiving antenna 31 receives broadcast waves multiplexed with video signals compressed using MPEG-2 (ITU-T Rec. H.262|ISO/IEC 13818-2), and flags showing whether the video signals are progressive scan or interlaced scan.

Tuner 32 selects a broadcast wave received from antenna 31, and outputs the selected broadcast wave to demodulation circuit 4. Demodulation by demodulation circuit 4 is performed using this output.

In the present embodiment as described above, similar effects to embodiment 1 can be achieved because the playback device is able to perform similar processing to embodiment 1, even in the case where progressive signals, interlaced signals, and pull-down signals are included in video signals transmitted as broadcast waves.

Embodiment 6

Embodiments 1 to 4 describe optical disc 1 as being the input source of the video signal. Embodiment 6 concerns an improvement in the case where the input source of the video signal is a hard disk. FIG. 21 shows an internal structure of a playback device in the case where the input source of the video signal is a hard disk. A comparison of FIG. 20 with the internal structure diagrams of embodiments 1 to 4 reveals that disc 1, optical pickup 2, and motor 3 have been replaced with a hard disk 33. The inclusion of hard disk 33 constitutes the improvement of the present embodiment.

Hard disk 33 is a built-in disk having video streams compressed using MPEG-2 (ITU-T Rec. H.262|ISO/IEC 13818-2) recorded thereon. Video signals input to the playback device via antenna 31 and tuner 32 are recorded on hard disk 33 in a digitized state. Flags showing whether the compressed video signals are progressive scan or interlaced scan are also recorded on hard disk 33.

Tuner 32 selects a broadcast wave received from antenna 31, and outputs the selected broadcast wave to demodulation circuit 4. Demodulation by demodulation circuit 4 is performed using this output.

In the present embodiment as described above, similar effects to embodiment 1 can be achieved because the playback device is able to perform similar processing to embodiment 1, even in the case where progressive signals, interlaced signals, and pull-down signals are included in video signals transmitted via broadcast waves and stored on hard disk.

Notes

Although the best mode known to the applicant at the time the application was filed has been described above, further improvements and modifications can be added in relation to the technical topics shown below. Whether or not to perform these improvements and modifications is arbitrary, and it should be noted that these improvements and modifications arise from the intentions of the executor of the invention.

Realization of Control Procedures

The control procedures described in the preferred embodiments with reference to the flowcharts, and the control procedures performed by the functional constituent elements involve the creation of a technical idea utilizing natural laws, and satisfy the establishment requirements for a program invention, given that they are specifically realized using hardware resources.

Production Configuration of Computer Program

Computer programs pertaining to the present invention can be made as follows. To begin with, a programmer firstly writes source programs that realize the flowcharts and the functional constituent elements. The source programs that the programmer writes embody the flowcharts and functional constituent elements, using class structures, variables, array variables, and external function calls, in accordance with the structure of a programming language.

The created source programs are provided to a compiler as files. The compiler translates these source programs to create object programs.

The translation by the compiler is composed of syntax analysis, optimization, resource allocation, and code generation processes. Syntax analysis involves lexical analysis, syntax analysis and semantic analysis being performed on the source programs, and the source programs being converted to intermediary programs. Optimization involves performing basic block analysis, control flow analysis, and data flow analysis on the intermediary programs. Resource allocation involves allocating variables in the intermediary programs to registers or memory in the target processor, in order to achieve conformity with the instruction set of the target processor. Code generation involves converting intermediary instructions in the intermediary programs to program code to obtain object programs.

Here, the generated object programs are constituted from one or more program codes for causing a computer to execute the steps of the flowcharts shown in the preferred embodiments and the individual procedures of the functional constituent elements. Here, there are various types of program code, such as JAVA byte code and the native code of a particular processor. There are various ways of realizing the steps using program code. If the steps are realized using an external function, the program code is a call for calling the external function. Furthermore, program code for realizing one step may also belong to different object programs. With a RISC program having restrictions on instruction type, the steps in the flowcharts may also be realized by incorporating arithmetic instructions, logic instructions, and branch instructions etc.

Once the object programs have been generated, the programmer runs a linker on these programs. The linker allots the object programs and related library programs to memory space and combines them into one to generate a load module. The generated load module is premised on reading by a computer, and causes the computer to execute the processing procedures shown in the flowcharts and the processing procedures of the functional constituent elements. Computer programs pertaining to the present invention can be created through this processing.

Usage Configurations of the Computer Programs

Computer programs pertaining to the present invention can be used as follows.

(i) Use as Incorporated Programs

If computer programs pertaining to the present invention are used as incorporated programs, the load module equating to these programs is written into instruction ROM together with basic I/O programs (BIOS) and various middleware (operating system). Through incorporating this instruction ROM in a control unit and causing a CPU to execute the programs in the instruction ROM, programs pertaining to the present invention can be used as control programs.

(ii) Use as Applications

If the playback device has a built-in hard disk, the basic I/O programs (BIOS) are incorporated into the instruction ROM and the middleware (operating system) is preinstalled in the hard disk. Furthermore, a boot ROM for bootstrapping the operating system from the hard disk is provided in the playback device.

In this case, only the load module is supplied to the playback device via a network or a portable recording medium, and installed on the hard disk as a single application. Then, having bootstrapped the operating system using the boot ROM, the playback device causes the CPU to execute the application as a single application, and thereby uses the programs pertaining to the present invention.

With the playback device having a built-in hard disk, programs of the present invention may be used as a single application, making it possible for programs pertaining to the present invention to be separately transferred, rented or supplied via a network.

Realizing Constituent Elements 4 to 16

Constituent elements 4 to 16 can be individually realized as a single system LSI. Alternatively, constituent elements 4 to 16 can be collectively realized as a single system LSI.

A system LSI is a packaged large-scale integrated chip constituted by mounting bare chips on a high-density substrate. By mounting a plurality of bare chips on a high-density substrate, a package in which a plurality of bare chips are provided with the outward appearance of a single LSI is also included as a system LSI (this type of system LSI is referred to as a multichip module).

Focusing now on the types of packages, system LSIs include quad flat packages (QFP) and pin grid arrays (PGA). With a QFP, pins are attached to the four-sides of the package. With a PGA, the majority of pins are attached to the bottom of the package.

These pins are charged with the task of being interfaces to other circuits. Given that the pins in a system LSI have this role as interfaces, the system LSI acts as the core of the playback device if other circuits are connected to these pins in the system LSI.

Bare chips packaged in a system LSI are each composed of a front-end unit, a back-end unit, and a digital processing unit. The front-end unit digitizes analog signals, and the back-end unit converts data resulting from the digital processing to analog and outputs the converted data.

The constituent elements shown in the internal structure diagrams of the preferred embodiments are mounted in the digital processing unit.

As mentioned in the above section on the use of the programs of the present invention as incorporated programs, a load module equating to these programs is written into an instruction ROM together with basic I/O programs (BIOS) and various middleware (operating system). In the present embodiment, it is the load module equating to the programs of the present invention that is created in particular, thereby enabling a system LSI pertaining to the present invention to be produced by packaging the instruction ROM storing this load module as bare chips.

System-on-chip (SoC) technology or system-in-package (SiP) technology preferably is used in the mounting. SoC technology involves fusing a plurality of circuits to a single chip. SiP technology involves using resin or the like to form a plurality of chips into a single package. It is possible, through this processing, to create a system LSI pertaining to the present invention, based on the internal structure diagrams of the playback device shown in the preferred embodiments.

Note that an integrated circuit generated as described above may also be referred to as an IC, an LSI, a super LSI, or an ultra LSI, depending on the degree of integration.

Furthermore, all or some of the constituent elements of the playback device may be constituted as a single chip. The integration is also not limited to SoC and SiP technology, and may be realized by a dedicated circuit or by a general-purpose process. After LSI manufacture, the use a field programmable gate array (FPGA) or a silicon flexible processor in which the connection and settings of circuit cells in the LSI can be restructured is considered possible. Furthermore, if integration technology is developed that replaces LSIs due to progressive or derivative semiconductor technology, integration of functional blocks using this technology is naturally possible. For example, the adaptation of biotechnology is a possibility.

Types of Recording Media

In embodiment 1, disc 1 (recording medium) is given as an example of a read-only optical disc, although the configuration of the recording medium and the recording method is not limited to this. Furthermore, optical pickup 2 and motor 3 etc. are necessary elements in a structure that is premised on the provision of disc 1. However, if the type and configuration of the recording medium adopts another structure, such as a semiconductor memory card, the means of driving the recording medium and the means of recording/playing signals in relation to the recording medium may be decided as necessary in terms of what is suitable for the recording medium.

Input of Interlaced Signals

Although not specifically described above, hybrid monitor 400 and 60 Hz monitor 500 in embodiment 1 have the capacity to display interlaced video signals. When the input signal is an interlaced signal, scan conversion circuit 8 in the playback device may through output the interlaced signal, rather than converting the signal to a 60 Hz progressive signal. Since the switching of display frequencies between 24 Hz and 60 Hz arises even when interlaced signals are through output, the selection of whether to set continuity mode, which avoids the possibility of interrupted display, or image quality mode, which invites the possibility of interrupted display, is effective.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback device comprising:
a judging unit operable to judge whether a display device connected to the playback device is equipped to display a first video signal at only a first frame rate or a second video signal with a mixed signal at both the first frame rate and a second frame rate for playback;
a mode setting unit operable to set an operation mode of the playback device, according to a user selection, to one of a continuous mode prohibiting frame rate switching during playback and a discontinuous mode permitting frame rate switching during playback,
when the second video signal for playback is switched from the first frame rate to the second frame rate in the discontinuous mode, the signal output performed by the playback unit is switched from the first frame rate to the second frame rate, and
when the second video signal for playback is switched from the first frame rate to the second frame rate in the continuous mode, the signal output performed by the playback unit is maintained at the first frame rate; and
a playback unit operable, if the playback device is set to the discontinuous mode, to perform signal output at one of the first frame rate and the second frame rate.

2. The playback device of claim 1, wherein
the mode setting unit receives the user selection of one of the continuous mode and the discontinuous mode via a graphic user interface, and
the graphic user interface warns the user of a possibility of display on the display device being disrupted if the mixed signal is output in the discontinuous mode.

3. The playback device of claim 1 further comprising:

a video judging circuit operable to judge whether a video signal for playback is a signal with the first frame rate having duplicate fields; and a conversion circuit operable, if the video judging circuit judges in the affirmative, to output the video signal after converting the first frame rate of the video signal to the second frame rate.

4. The playback device of claim 3, wherein the video judging circuit performs processing to detect a timing at which duplicate fields appear, and the conversion circuit includes:

a scan conversion circuit operable to classify fields in the video signal with the first frame rate into fields constituting a same frame, using the timing at which duplicate fields appear as a boundary between frames; and a frame rate conversion circuit operable to convert the first frame rate of fields in the video signal classified as constituting the same frame to the second frame rate.

5. The playback device of claim 1 further comprising:

a video judging circuit operable to judge whether a video signal for playback is a signal with the second frame rate, and the playback unit, if the video judging circuit judges in the affirmative, instructs the display device to display at a predetermined frame rate, and outputs the video signal after converting the second frame rate of the video signal to the predetermined frame rate.

6. The playback device of claim 5, wherein the predetermined frame rate is an integer multiple of 24 Hz, and the playback unit includes a frame rate conversion circuit operable to output the video signal after converting the second frame rate of the video signal to the integer multiple of 24 Hz.

7. The playback device of claim 1, wherein the playback device is connected to the display device via a predetermined interface, and the judging unit extracts information on a video standard from the display device via the predetermined interface, and judges whether the display device connected to the playback device is equipped to display at only the first frame rate or at both the first and second frame rates, based on the extracted video standard information.

\* \* \* \* \*